US012562920B2

(12) United States Patent (10) Patent No.: US 12,562,920 B2
Panshin et al. (45) Date of Patent: Feb. 24, 2026

(54) DIGITAL SIGNATURE

(71) Applicant: Hewlett-Packard Development Company, L.P., Spring, TX (US)

(72) Inventors: Stephen D. Panshin, Corvallis, OR (US); Paul S. Everest, Corvallis, OR (US); Michael Harmon, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 19/197,933

(22) Filed: May 2, 2025

(65) Prior Publication Data

US 2025/0323798 A1    Oct. 16, 2025

Related U.S. Application Data

(63) Continuation of application No. 18/994,046, filed as application No. PCT/US2022/037320 on Jul. 15, 2022.

(51) Int. Cl.
*H04L 9/32* (2006.01)
(52) U.S. Cl.
CPC .................................. *H04L 9/3247* (2013.01)
(58) Field of Classification Search
CPC ... H04L 63/0823; H04L 63/08; H04L 9/3247; H04L 9/0869; G06F 21/44; G06F 21/57; G06F 21/33
See application file for complete search history.

(56) References Cited

U.S. PATENT DOCUMENTS

| 6,499,028 B1 | 12/2002 | Brock et al. |
| 7,552,333 B2 | 6/2009 | Wheeler et al. |
| 7,792,760 B2 | 9/2010 | Nakazawa |
| 8,060,747 B1 | 11/2011 | Leonard et al. |
| 8,135,954 B2 * | 3/2012 | Voss ..................... H04L 63/101 |
| | | 380/30 |
| 8,205,976 B2 | 6/2012 | Helterline |

(Continued)

FOREIGN PATENT DOCUMENTS

| CN | 102112960 A | 6/2011 |
| CN | 113168450 A | 7/2021 |

(Continued)

OTHER PUBLICATIONS

Kammerstetter, Markus, et al. "Breaking integrated circuit device security through test mode silicon reverse engineering." Proceedings of the 2014 Acm Sigsac Conference on Computer and Communications Security. 2014, pp. 549-557. (Year: 2014).*

(Continued)

*Primary Examiner* — Kari L Schmidt
(74) *Attorney, Agent, or Firm* — Foley & Lardner LLP

(57) ABSTRACT

A logic circuitry package includes an interface to communicate with a controller and a logic circuit. The logic circuit includes a memory arrangement storing a first digital signature, a second digital signature, and a third digital signature signed over the first digital signature and the second digital signature. The logic circuit is configured to receive at least one request from the controller; and transmit the first digital signature, the second digital signature, and the third digital signature to the controller in response to the at least one request.

20 Claims, 20 Drawing Sheets

(56) References Cited

U.S. PATENT DOCUMENTS

| | | | |
|---|---|---|---|
| 8,429,410 B2 | 4/2013 | Little et al. | |
| 9,059,858 B1 | 6/2015 | Giardina et al. | |
| 9,327,510 B2 * | 5/2016 | Simpson | G06F 3/1273 |
| 9,767,318 B1 | 9/2017 | Dropps | |
| 9,959,493 B2 * | 5/2018 | Adkins | G06K 15/407 |
| 10,922,679 B2 * | 2/2021 | Geraud | G06Q 20/352 |
| 11,020,976 B2 | 6/2021 | Ward et al. | |
| 11,048,791 B2 | 6/2021 | Simpson et al. | |
| 11,137,699 B1 * | 10/2021 | Williamson | G03G 21/1896 |
| 11,616,999 B1 | 3/2023 | Borawski et al. | |
| 11,743,047 B2 | 8/2023 | Rahn et al. | |
| 2003/0009662 A1 | 1/2003 | Gindin et al. | |
| 2003/0028780 A1 | 2/2003 | Burnett | |
| 2004/0153415 A1 * | 8/2004 | Adkins | G06Q 20/3674 |
| | | | 705/59 |
| 2005/0289346 A1 | 12/2005 | Minagawa | |
| 2008/0263676 A1 | 10/2008 | Mo et al. | |
| 2009/0106614 A1 | 4/2009 | Desineni et al. | |
| 2009/0319802 A1 * | 12/2009 | Walmsley | H04L 9/3247 |
| | | | 713/189 |
| 2013/0099899 A1 * | 4/2013 | Thacker, III | H04Q 5/22 |
| | | | 340/10.4 |
| 2014/0267476 A1 * | 9/2014 | Simpson | G06F 3/1203 |
| | | | 347/5 |
| 2015/0304484 A1 * | 10/2015 | Halmstad | H04W 48/02 |
| | | | 455/419 |
| 2016/0187827 A1 * | 6/2016 | Jeran | G06F 21/608 |
| | | | 399/12 |
| 2016/0248746 A1 | 8/2016 | James et al. | |
| 2016/0294792 A1 | 10/2016 | Tasher et al. | |
| 2016/0294829 A1 | 10/2016 | Angus | |
| 2016/0306757 A1 | 10/2016 | Mccabe et al. | |
| 2017/0230540 A1 * | 8/2017 | Sasaki | G06F 21/44 |
| 2017/0330046 A1 * | 11/2017 | Pollard | H04N 1/32256 |
| 2018/0183601 A1 | 6/2018 | Campagna et al. | |
| 2018/0295506 A1 * | 10/2018 | Hawkes | G06F 21/44 |
| 2019/0012435 A1 | 1/2019 | Bain | |
| 2019/0372775 A1 | 12/2019 | Camenisch et al. | |
| 2020/0034554 A1 * | 1/2020 | Enomoto | H04W 12/06 |
| 2020/0233978 A1 * | 7/2020 | Sofia | H04L 9/3247 |
| 2020/0382319 A1 * | 12/2020 | Ramaraju | H04L 9/3239 |
| 2020/0401734 A1 | 12/2020 | Murdoch et al. | |
| 2021/0146694 A1 | 5/2021 | Wagener et al. | |
| 2021/0213746 A1 | 7/2021 | Gardner et al. | |
| 2021/0213747 A1 | 7/2021 | Ward | |
| 2021/0290862 A1 * | 9/2021 | Darling | A61M 11/007 |
| 2021/0402783 A1 | 12/2021 | Studer et al. | |
| 2022/0075873 A1 | 3/2022 | Gao | |
| 2022/0150073 A1 | 5/2022 | Androulaki et al. | |
| 2022/0342344 A1 * | 10/2022 | Yu | G03G 15/55 |
| 2022/0350894 A1 | 11/2022 | Duval | |
| 2022/0368517 A1 * | 11/2022 | Shin | H04L 9/088 |
| 2023/0308439 A1 * | 9/2023 | Nagaraj | G06F 21/44 |
| 2024/0146540 A1 * | 5/2024 | Castle | G06F 21/64 |

FOREIGN PATENT DOCUMENTS

| | | |
|---|---|---|
| CN | 113168457 A | 7/2021 |
| EP | 2852090 A1 | 3/2015 |
| TW | 202223702 A | 6/2022 |
| WO | 2015/016857 A1 | 2/2015 |
| WO | 2015/016863 A1 | 2/2015 |
| WO | 2024/015075 A1 | 1/2024 |

OTHER PUBLICATIONS

U. Guin, K. Huang, D. DiMase, J. M. Carulli, M. Tehranipoor and Y. Makris, "Counterfeit Integrated Circuits: A Rising Threat in the Global Semiconductor Supply Chain," in Proceedings of the IEEE, vol. 102, No. 8, pp. 1207-1228, Aug. 2014. (Year: 2014).*

X. Guo, R. G. Dutta and Y. Jin, "Hierarchy-Preserving Formal Verification Methods for Pre-silicon Security Assurance," 2015 16th International Workshop on Microprocessor and SOC Test and Verification (MTV), Austin, TX, USA, 2015, pp. 48-53. (Year: 2015).*

* cited by examiner

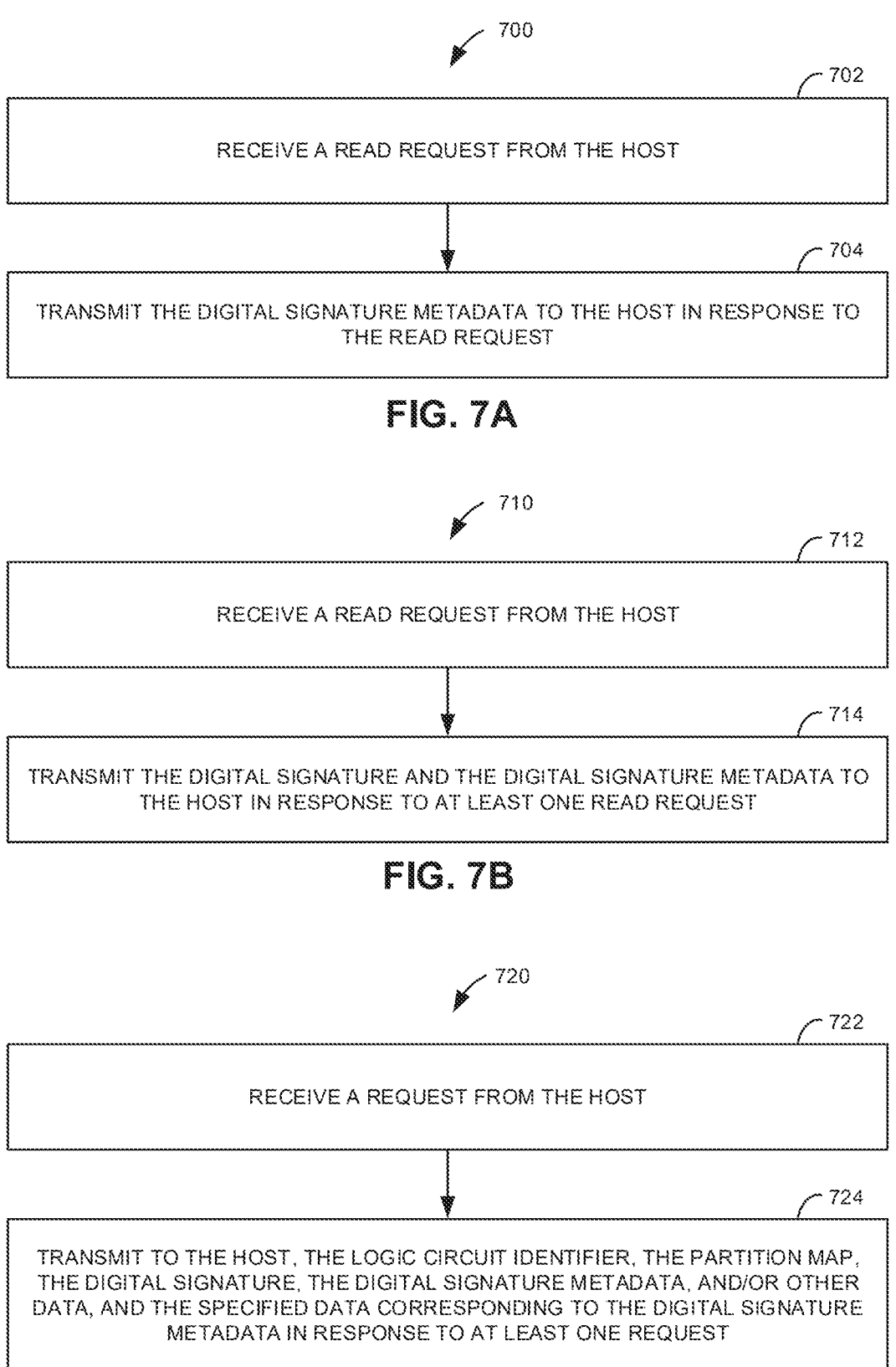

700

702

RECEIVE A READ REQUEST FROM THE HOST

704

TRANSMIT THE DIGITAL SIGNATURE METADATA TO THE HOST IN RESPONSE TO THE READ REQUEST

RECEIVE A READ REQUEST FROM THE HOST

714

TRANSMIT THE DIGITAL SIGNATURE AND THE DIGITAL SIGNATURE METADATA TO THE HOST IN RESPONSE TO AT LEAST ONE READ REQUEST

RECEIVE A REQUEST FROM THE HOST

724

TRANSMIT TO THE HOST, THE LOGIC CIRCUIT IDENTIFIER, THE PARTITION MAP, THE DIGITAL SIGNATURE, THE DIGITAL SIGNATURE METADATA, AND/OR OTHER DATA, AND THE SPECIFIED DATA CORRESPONDING TO THE DIGITAL SIGNATURE METADATA IN RESPONSE TO AT LEAST ONE REQUEST

FIG. 7C

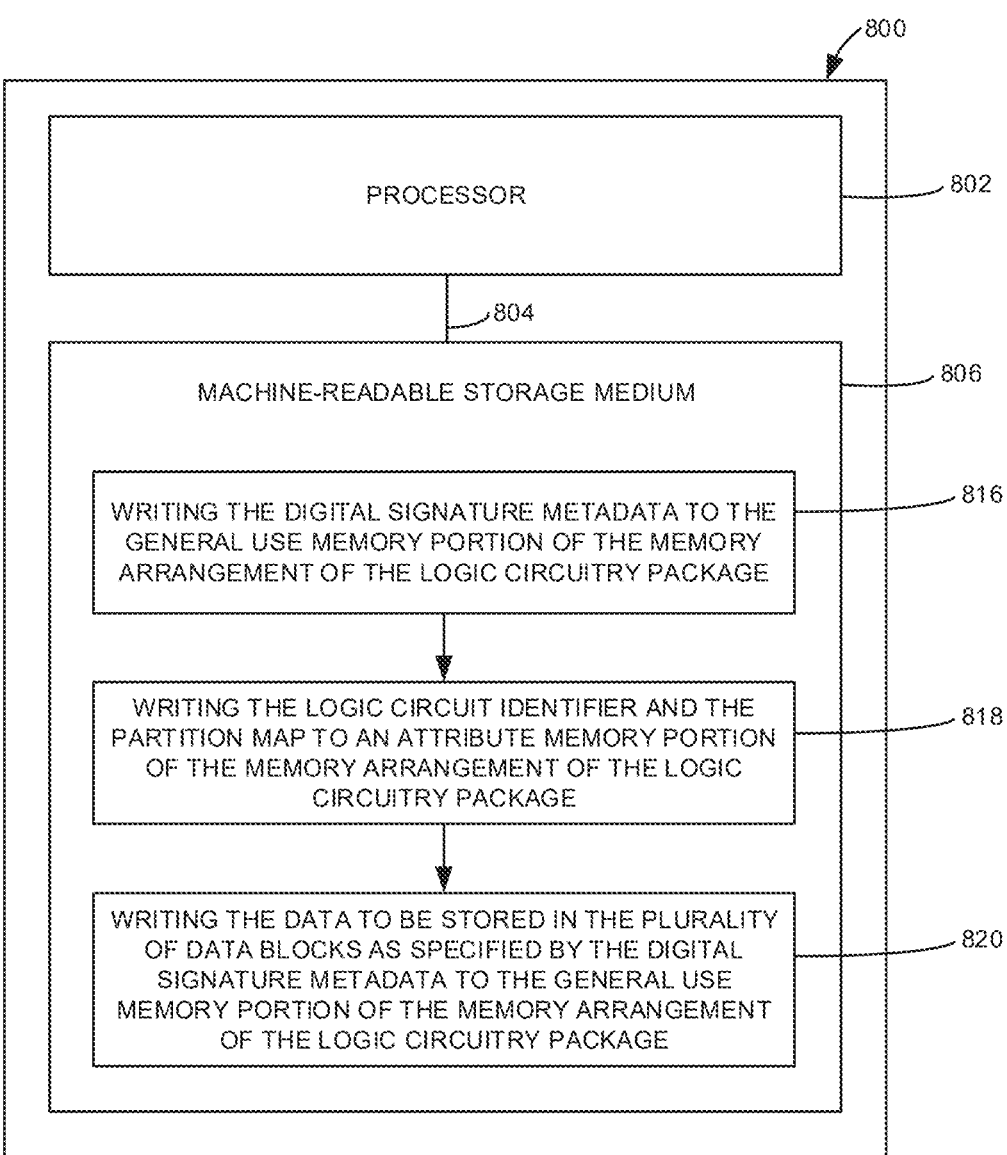

800

PROCESSOR

802

804

MACHINE-READABLE STORAGE MEDIUM

806

WRITING THE DIGITAL SIGNATURE METADATA TO THE GENERAL USE MEMORY PORTION OF THE MEMORY ARRANGEMENT OF THE LOGIC CIRCUITRY PACKAGE

816

WRITING THE LOGIC CIRCUIT IDENTIFIER AND THE PARTITION MAP TO AN ATTRIBUTE MEMORY PORTION OF THE MEMORY ARRANGEMENT OF THE LOGIC CIRCUITRY PACKAGE

818

WRITING THE DATA TO BE STORED IN THE PLURALITY OF DATA BLOCKS AS SPECIFIED BY THE DIGITAL SIGNATURE METADATA TO THE GENERAL USE MEMORY PORTION OF THE MEMORY ARRANGEMENT OF THE LOGIC CIRCUITRY PACKAGE

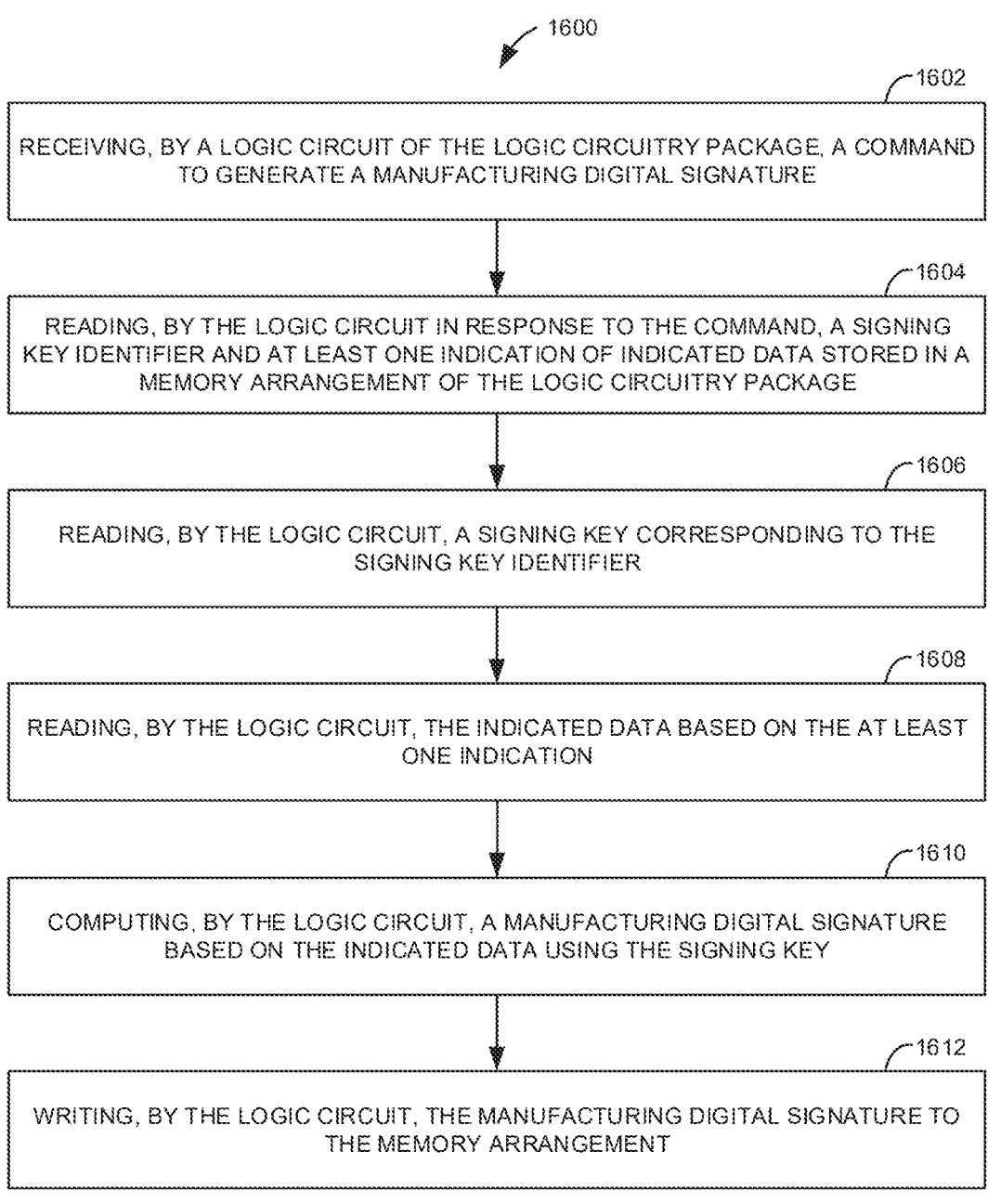

1600

1602

RECEIVING, BY A LOGIC CIRCUIT OF THE LOGIC CIRCUITRY PACKAGE, A COMMAND TO GENERATE A MANUFACTURING DIGITAL SIGNATURE

1604

READING, BY THE LOGIC CIRCUIT IN RESPONSE TO THE COMMAND, A SIGNING KEY IDENTIFIER AND AT LEAST ONE INDICATION OF INDICATED DATA STORED IN A MEMORY ARRANGEMENT OF THE LOGIC CIRCUITRY PACKAGE

1606

READING, BY THE LOGIC CIRCUIT, A SIGNING KEY CORRESPONDING TO THE SIGNING KEY IDENTIFIER

1608

READING, BY THE LOGIC CIRCUIT, THE INDICATED DATA BASED ON THE AT LEAST ONE INDICATION

1610

COMPUTING, BY THE LOGIC CIRCUIT, A MANUFACTURING DIGITAL SIGNATURE BASED ON THE INDICATED DATA USING THE SIGNING KEY

1612

WRITING, BY THE LOGIC CIRCUIT, THE MANUFACTURING DIGITAL SIGNATURE TO THE MEMORY ARRANGEMENT

FIG. 16

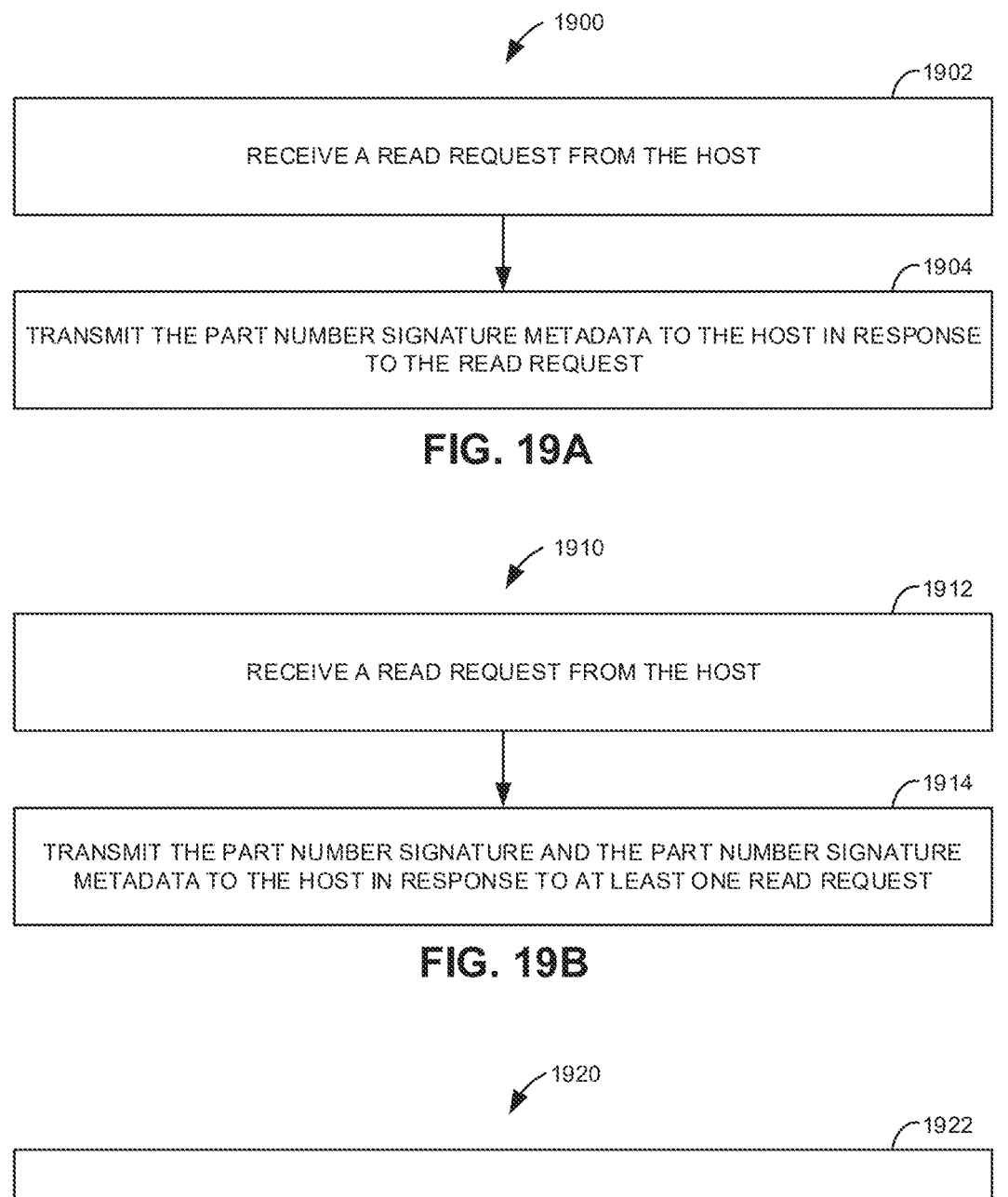

1900

1902

RECEIVE A READ REQUEST FROM THE HOST

1904

TRANSMIT THE PART NUMBER SIGNATURE METADATA TO THE HOST IN RESPONSE TO THE READ REQUEST

RECEIVE A READ REQUEST FROM THE HOST

1914

TRANSMIT THE PART NUMBER SIGNATURE AND THE PART NUMBER SIGNATURE METADATA TO THE HOST IN RESPONSE TO AT LEAST ONE READ REQUEST

RECEIVE A REQUEST FROM THE HOST

1924

TRANSMIT TO THE HOST, THE PART NUMBER SIGNATURE, THE PART NUMBER SIGNATURE METADATA, AND/OR OTHER DATA, AND THE PART NUMBER SIGNATURE SPECIFIED DATA CORRESPONDING TO THE PART NUMBER SIGNATURE METADATA IN RESPONSE TO AT LEAST ONE REQUEST

FIG. 19C

DIGITAL SIGNATURE

CROSS-REFERENCE TO RELATED PATENT APPLICATIONS

This application is a continuation patent application that claims priority under 35 U.S.C. § 120 to U.S. patent application Ser. No. 18/994,046, filed Jan. 13, 2025, which is a U.S. National Stage Entry under 35 U.S.C. § 371 of International Application No.: PCT/US2022/037320, filed Jul. 15, 2022, the contents of all such applications being hereby incorporated by reference in their entirety and for all purposes as if completely and fully set forth herein.

BACKGROUND

Subcomponents of apparatus may communicate with one another in a number of ways. For example, Serial Peripheral Interface (SPI) protocol, Bluetooth Low Energy (BLE), Near Field Communications (NFC) or other types of digital or analog communications may be used.

Some two-dimensional (2D) and three-dimensional (3D) printing systems include one or more replaceable print apparatus components, such as print material containers (e.g., inkjet cartridges, toner cartridges, ink supplies, 3D printing agent supplies, build material supplies, etc.), inkjet printhead assemblies, and the like. In some examples, logic circuitry associated with the replaceable print apparatus component(s) communicates with logic circuitry of the print apparatus in which they are installed, for example communicating information such as their identity, capabilities, status, and the like. Similarly, other communication systems use logic circuits to connect to a host logic circuit, of which general examples include network communication systems, life science applications, automotive industry, the internet of things, etc.

Many instances of logic circuitry include a digital signature comprising signed data. The data may be generated and signed at manufacturing. The signature can be verified by a host or controller, whereby the signed data can be assumed to represent trusted data originating from, for example, an Original Equipment Manufacturer or other trusted/authorized party.

BRIEF DESCRIPTION OF THE DRAWINGS

FIGS. 7A-7D are flow diagrams illustrating example methods that may be carried out by a logic circuit.

FIGS. 8A and 8B are block diagrams illustrating one example of a processing system for provisioning a logic circuitry package.

FIG. 16 is a flow diagram illustrating one example of a method for provisioning a logic circuitry package comprising a memory arrangement.

FIGS. 19A-19C are flow diagrams illustrating other example methods that may be carried out by a logic circuit.

DETAILED DESCRIPTION

Figure 1:
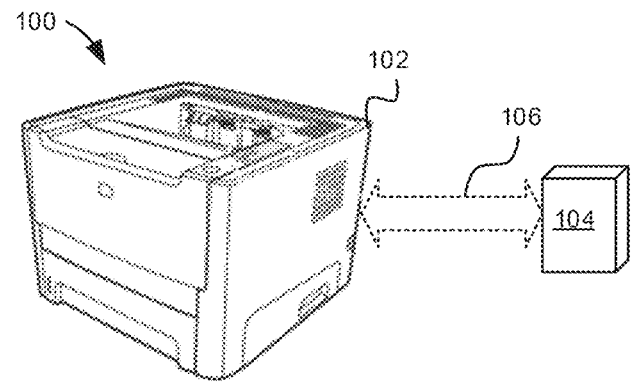
FIG. 1 illustrates one example of a printing system.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that each individual feature or combination of features of the various examples described herein may be combined, in part or whole, with each other individual feature or combination of features.

Some examples of applications described herein are in the context of print apparatus. Not all the examples, however, are limited to such applications, and at least some of the principles set out herein may be used in other contexts, including but not limited to other communication systems, network communication systems, life science applications, automotive industry, the internet of things, beverages, etc.

Certain non-authorized third parties attempt to reverse engineer parts of Original Equipment Manufacturers (OEMs) or otherwise authorized parties to connect to apparatuses of OEMs or otherwise authorized parties. Authorized parties, which may also be referred to as trusted parties, include parties in the authorized chain that may include OEMs, suppliers, developers, etc., for example authorized by intellectual property rights or otherwise associated with these parts and apparatus, while non-authorized third parties may be third parties that try to at least partially copy the original logic circuits of these authorized parties to connect to the host apparatus of these authorized parties, without any pre-authorized relation with the authorized parties.

In one practical example, logic circuits may include microcontrollers attached, or configured to be attached, to print consumable cartridges, where the host print apparatus logic circuits may include printer controllers and/or printer microcontrollers. In this disclosure, the host logic circuit may be any host side microcontroller, controller, application specific integrated circuit (ASIC), or the like. The host logic circuit may sometimes be referred to, simply, as "host", while a "logic circuit" by itself should refer to the component-side logic circuit, not the host. Furthermore, the principles set out in this disclosure may be applied to any two opposite communicating devices without any hierarchical implication, for example, without needing a host versus component relationship. Hence, throughout this disclosure, "host" may be replaced by "controller". A controller may comprise a system component, host, supply device, computer, printer, etc. The host or controller may comprise an opposite microcontroller and/or firmware that communicates with a logic circuit of this disclosure. In a host print apparatus, the host print apparatus logic circuit may command a logic circuit of a replaceable print supply component. In other examples, it is not excluded that the logic circuit of this disclosure could command the opposite controller or host. Therefore, a host may comprise any controller or other logic circuit.

A host or controller may be developed to only accept consumables (e.g., cartridges, containers, etc.) that contain keys, attributes, and data that originates from a trusted party (e.g., OEM). To address this, as disclosed herein, a digital signature is provided over select attributes and data. The digital signature is generated using a private key and is written to the consumable. Firmware in the host may store (or have access to) the corresponding public key to validate the digital signature. If validation of the digital signature is successful, the keys, attributes, and data are genuine and the consumable may be accepted and used by the host. If validation of the digital signature is unsuccessful, the keys, attributes, or data are not genuine and the consumable may be rejected by the host. As used herein, the term "signature" refers to a "digital signature" and "signature" and "digital signature" may be used interchangeably. A digital signature as disclosed herein may be signed directly over select attributes and/or data, indirectly over select attributes and/or data, such as over a hash of the select attributes and/or data, or a combination thereof.

To enable validation of the digital signature by the host, the consumable may indicate which attributes and data were used to generate the digital signature. In one example, disclosed herein is a flexible, extensible schema for specifying the data over which the digital signature is computed. The data may include certificates, such as custom certificate formats that do not otherwise contain a means of attestation. The schema disclosed herein allows select keys, attributes, and data on the consumable to be confirmed as genuine, or at least, developed by a party having access to the private key associated with the digital signature and/or schema. The private key may comprise a trade secret or the like and the party with access to the private key may be an authorized party. The digital signature may force non-authorized manufacturers to make copies of complete attribute and data sets from genuine consumables, instead of using non-genuine attributes, data, or combinations. For example, the digital signature may make identifying and/or alerting customers to the presence of non-genuine consumables easier, for example through hosts or servers or otherwise. The flexible and extensible method for specifying attributes and data included in the digital signature may save memory in the consumable and may allow for a simpler and more efficient process for signature verification. For example, a single digital signature may be used to attest to multiple OEM proprietary certificates. Digital signature schemes and aspects addressed in this disclosure may be applied to different types of digital circuitries including any computing or processing device, for example with some type of interconnection capability, directly physically and/or over any type of network.

As said, logic circuitry packages may be associated with print apparatus components such as cartridges or containers, and host logic circuits may be associated with host print apparatus to which the components are to be connected. In other examples, logic circuits do not need to be associated with print components or host print apparatus and hosts may be replaced by any type controller not necessarily in a host versus component relationship. Logic circuits and controllers can be used in conjunction with any Micro-Electrical Mechanical System, Lab-on-Chip, mobile computing device, and/or Life Science application. A wide range of applications require a logic circuitry package such as a microcontroller to securely connect to a host, physically and/or communicatively. The logic circuitry packages may connect to any type of host, for example any computing system, server, car system, apparatus for domestic use, access control systems, etc. While many examples of this disclosure involve logic circuitry packages and logic circuits for print apparatus components to connect to a host print apparatus logic circuit, the features of logic circuitry packages can be applied outside of the field of printing, by itself or in association with any component, to connect to any type of host logic circuit, not necessarily associated with a print apparatus component or print apparatus, respectively. Hence, where this disclosure refers to a print apparatus and print apparatus component (or cartridge or container), or the like, the apparatus can be any apparatus and the component can be any component. Examples of this disclosure allow for a host logic circuit to securely identify and authenticate a logic circuit.

In certain examples, Inter-integrated Circuit (I2C, or I2C, which notation is adopted herein) protocol allows at least one 'leader' (commonly referred to as a 'master') integrated circuit (IC) to communicate with at least one 'follower' (commonly referred to as a 'slave') IC, for example via a bus. I2C, and other communications protocols, communicate data according to a clock period. For example, a voltage signal may be generated, where the value of the voltage is associated with data. For example, a voltage value above X volts may indicate a logic "1" whereas a voltage value below Y volts may indicate a logic "0", where X and Y are predetermined numerical values and Y is less than or equal to X. By generating an appropriate voltage in each of a series of clock periods, data can be communicated via a bus or another communication link. Certain examples of this disclosure concern follower or slave logic. In other examples, there need not be a master-slave or leader-follower or host-component relationship, whereby both oppositely communicating logic circuits (e.g., microcontrollers) can receive commands and respond to commands.

In at least some examples, a plurality of logic circuitry packages (each of which may be associated with a different replaceable print apparatus component or container) may be connected to an I2C bus. Certain example print material containers have follower logic that utilize I2C communications, although in other examples, other forms of digital or analog communications could also be used. In the example of I2C communication, a leader IC may generally be provided as part of the print apparatus (which may be referred to as the 'host') and a replaceable print apparatus component would comprise a 'follower' IC, although this need not be the case in all examples. There may be a plurality of follower ICs connected to an I2C communication link or bus (for example, containers of different colors of print agent). An address of the logic circuitry package may be an I2C compatible address (herein after, an I2C address), for example in accordance with an I2C protocol, to facilitate directing communications between leader to followers in accordance with the I2C protocol. The follower IC(s) may include a processor to perform data operations before responding to requests from logic circuitry of the print system. In certain examples, the follower IC, or logic circuitry package, of this disclosure may be connected to or integrated with any print apparatus component that can be or is connected to or integrated with a print apparatus. For example, the logic circuitry package or follower IC of this disclosure may be connected to a non-replaceable print apparatus component. In other examples, other forms of digital and/or analog communication can be used, other than I2C.

Communications between print apparatus and replaceable print apparatus components installed in the apparatus (and/ or the respective logic circuitry thereof) may facilitate various functions. Logic circuitry within a print apparatus may receive information from logic circuitry associated with a replaceable print apparatus component via a communications interface, and/or may send commands to the replaceable print apparatus component logic circuitry, which may include commands to write data to a memory associated therewith, or to read data therefrom.

In at least some of the examples described below, a logic circuitry package is described. The logic circuitry package may be associated with a replaceable print apparatus component, for example being internally or externally affixed thereto, for example at least partially within the housing, and is adapted to communicate data with a print apparatus controller via a bus provided as part of the print apparatus.

A 'logic circuitry package' as the term is used herein refers to one logic circuit, or more logic circuits that may be interconnected or communicatively linked to each other. Where more than one logic circuit is provided, these may be encapsulated as a single unit, or may be separately encapsulated, or not encapsulated, or some combination thereof. The package may be arranged or provided on a single substrate or a plurality of substrates. In some examples, the package may be directly affixed to a cartridge wall. In some examples, the package may include an interface, for example including pads or pins. The package interface may be intended to connect to a communication interface of the print apparatus component that in turn connects to a print apparatus logic circuit, or the package interface may connect directly to the print apparatus logic circuit. Example packages may be configured to communicate via a serial bus interface. Where more than one logic circuit is provided, these logic circuits may be connected to each other or to the interface, to communicate through the same interface.

In some examples, each logic circuitry package is provided with at least one processor and memory. In one example, the logic circuitry package may be, or may function as, a microcontroller or secure microcontroller. In use, the logic circuitry package may be adhered to or integrated with the replaceable print apparatus component, such as a replaceable print consumable (e.g., ink, toner) cartridge. A logic circuitry package may alternatively be referred to as a logic circuitry assembly, or simply as logic circuitry or processing circuitry.

In certain examples of this disclosure, a package or packaging refers to the result of the final assembly of the logic circuit or integrated circuit assembly process, that is, basically the final form of the processing circuitry hardware itself. The logic circuitry package may be a final product for shipping and selling and usage with respect to a host logic circuit in the field, or the logic circuitry package may be an intermediate product that may require further customization- or personalization- or writing steps, further assembly, and/or the further attachment or connection to another (e.g., print) component or circuit. In a relatively dressed down form, the package may be a substrate with thin film layers without further protection. In other examples, the package may comprise at least one circuit that is at least partially protected by encapsulation or molded material, and/or supported by a board (e.g., PCB) and/or flexible film and/or a molded plastic part, for example of a print cartridge. In certain instances, the logic circuit is substantially surrounded by protective and/or insulative material except for electrodes that are to connect the logic circuit to a host and/or other logic circuit. All these instances, and others, may refer to a package. "Package" is not to be confused with the industry term "packaging" although the package may include logic circuitry packaging.

In some examples, the logic circuitry package may respond to various types of requests (or commands) from a host (e.g., a print apparatus) logic circuit. Requests for example include read requests to read data from general use memory; query attribute requests to read attributes from attribute storage memory, and/or a start session request to start an authenticated communication session using a key stored in key storage memory. A request is a type of command.

FIG. 1 illustrates one example of a printing system 100. The printing system 100 includes a print apparatus 102 in communication with logic circuitry associated with a replaceable print apparatus component 104 via a communications link 106. In some examples, the communications link 106 may include an I2C capable or compatible bus (herein after, an I2C bus). Although for clarity, the replaceable print apparatus component 104 is shown as external to the print apparatus 102, in some examples, the replaceable print apparatus component 104 may be temporarily installed or permanently housed within the print apparatus.

The replaceable print apparatus component 104 may include, for example, a print material container or cartridge (which could be a build material container for 3D printing, a liquid or dry toner container for 2D printing, or an ink or liquid print agent container for 2D or 3D printing), which may in some examples include a print head or other dispensing or transfer component. The print material may be a consumable print material to be consumed by dispensing or transferring. In this disclosure, a print material, print consumable, or consumable print material may be the same thing, examples of which are indicated between parentheses above. The replaceable print apparatus component 104 may, for example, contain a consumable resource of the print apparatus 102, or a component which is likely to have a lifespan which is less (in some examples, considerably less) than that of the print apparatus 102. Moreover, while a single replaceable print apparatus component 104 is shown in this example, in other examples, there may be a plurality of replaceable print apparatus components, for example including print agent containers of different colors, print heads (which may be integral to the containers), or the like. In other examples, the print apparatus components 104 could include service components, for example to be replaced by service personnel, examples of which could include print heads, toner process cartridges, or logic circuitry packages by themselves to adhere to corresponding print apparatus components and communicate to a compatible print apparatus logic circuit. In other examples, the logic circuit of this disclosure may be communicatively connected to other apparatus other than a print apparatus.

Figure 2:
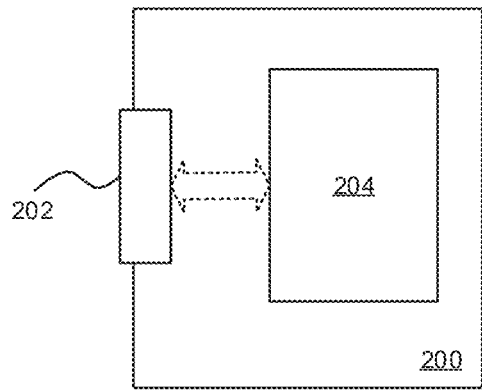
FIG. 2 illustrates one example of a replaceable print apparatus component.

FIG. 2 illustrates one example of a replaceable print apparatus component 200, which may provide the replaceable print apparatus component 104 of FIG. 1. The replaceable print apparatus component 200 includes a data interface 202 and a logic circuitry package 204. In use of the replaceable print apparatus component 200, the logic circuitry package 204 decodes data received via the data interface 202. The logic circuitry may perform other functions as set out below. The data interface 202 may include an I2C or other interface. In certain examples, the data interface 202 may be part of the same package as the logic circuitry package 204.

In some examples, the logic circuitry package 204 may be further configured to encode data for transmission via the data interface 202. In some examples, there may be more than one data interface 202 provided. In some examples, the logic circuitry package 204 may be arranged to act as a 'follower' in I2C communications.

Figure 3:
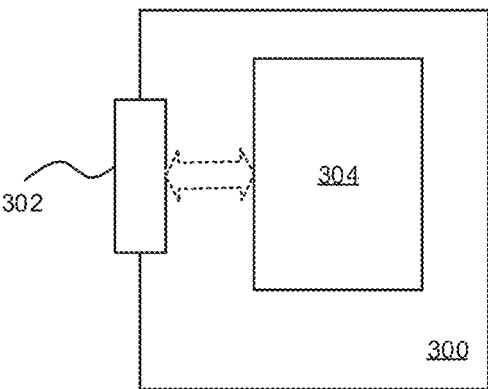
FIG. 3 illustrates one example of a print apparatus.

FIG. 3 illustrates one example of a print apparatus 300. The print apparatus 300 may provide the print apparatus 102 of FIG. 1. The print apparatus 300 may serve as a host for replaceable components. The print apparatus 300 includes an interface 302 for communication between the replaceable print apparatus component and the print apparatus logic circuit 304, such as a controller. In some examples, the interface 302 is an I2C interface.

In some examples, the print apparatus logic circuit 304 may be configured to act as a host, or a leader, in I2C communications. The print apparatus logic circuit 304 may generate and send commands to at least one replaceable print apparatus component 200, and may receive and decode responses received therefrom. In other examples, the print apparatus logic circuit 304 may communicate with the logic circuitry package 204 using any form of digital or analog communication.

The print apparatus 102, 300 and replaceable print apparatus component 104, 200, and/or the logic circuitry thereof, may be manufactured and/or sold separately. In an example, a user may acquire a print apparatus 102, 300 and retain the apparatus 102, 300 for a number of years. Even when the same version of said apparatus 102, 300 is not available anymore for purchase, the same apparatus continues to be used for printing in homes and offices. In contrast, during those subsequent years where the apparatus 102, 300 cannot be purchased anymore, replaceable print apparatus components 104, 200 may still be purchased to facilitate printing with said apparatus 102, 300. The print apparatus component logic circuits are upgraded over the years, for example to be compatible with the newer versions of print apparatuses. The same upgraded print apparatus component logic circuits may be kept backward-compatible to older versions of print apparatuses to be compatible with a broad variety of print apparatuses including both older and newer versions. It may be advantageous for an original equipment manufacturer (OEM) to produce print apparatus component logic circuits that are compatible with a broad variety of print apparatuses 102, 300, for example, to avoid needing to support multiple hardware versions and to avoid stock keeping unit (SKU) proliferation of the print apparatus component logic circuits. Therefore, there may be at least a degree of forwards and/or backwards compatibility between print apparatus 102, 300 and replaceable print apparatus components 104, 200.

Figure 4:
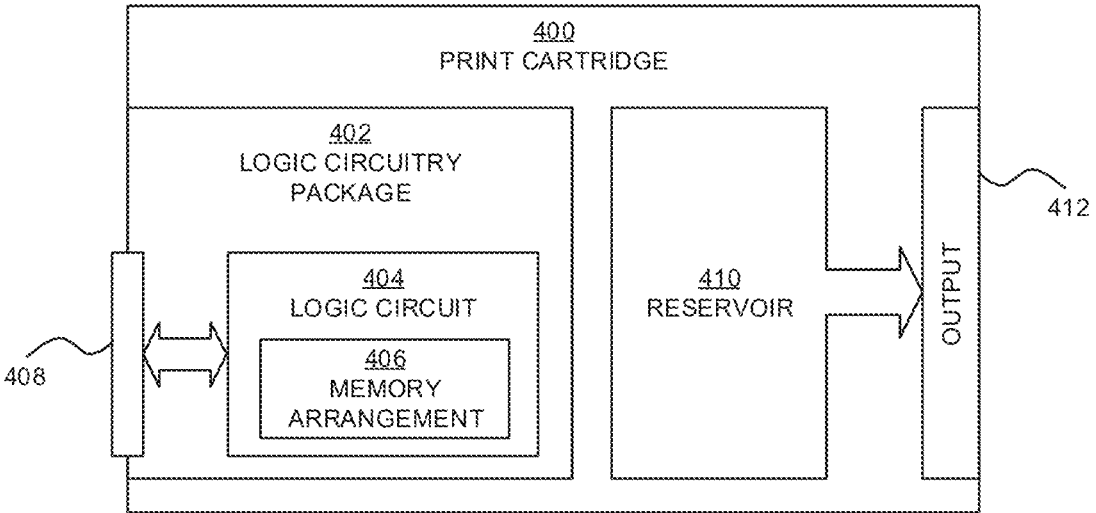
FIG. 4 illustrates one example of a replaceable print cartridge.

FIG. 4 illustrates one example of a replaceable print cartridge 400, such as a print consumable cartridge. Print cartridge 400 may provide the replaceable print apparatus component 104 of FIG. 1 or the replaceable print apparatus component 200 of FIG. 2. Print cartridge 400 includes a logic circuitry package 402 including a logic circuit 404 and an interface 408. In some examples, the interface 408 is an I2C interface. Logic circuit 404 includes a memory arrangement 406. In addition, print cartridge 400 includes a reservoir 410 to hold consumable material and an output 412 to dispense the consumable material. The consumable material may include ink, dry toner, liquid toner, a 3D print agent (e.g., a print enhancement agent, a print inhibiting agent, a build powder, such as a plastic powder or a metal powder), or another suitable consumable outside of the field of printing.

The logic circuitry package 402 may be associated with, or in some examples affixed to and/or be incorporated at least partially within the replaceable print cartridge 400. Logic circuit 404 is communicatively coupled to memory arrangement 406. Memory arrangement 406 may include a single or multiple memory devices, and may include any or any combination of volatile memory (e.g., Dynamic Random Access Memory (DRAM), Static Random Access Memory (SRAM), registers, etc.) and non-volatile memory (e.g., Read Only Memory (ROM), Electrically Erasable Programmable Read Only Memory (EEPROM), Flash, Erasable Programmable Read Only Memory (EPROM), memristor, etc.). In some examples, as described in more detail below with reference to FIGS. 5A-6B, memory arrangement 406 stores a digital signature and digital signature metadata corresponding to the digital signature. Logic circuit 402, as described in more detail below, may be configured to respond to requests from a host print apparatus logic circuit to verify the authenticity of select data and/or attributes of the logic circuit. If the select data and/or attributes of the logic circuit 402 is verified to be authentic, the replaceable print cartridge 400 may be used by the host print apparatus.

The example logic circuits disclosed herein may provide for a flexible digital signature schema, allowing a manufacturer or supplier to associate different amounts and types of data of choice with the digital signature of the schema, with respect to the same controller or host that is to verify the digital signature. Hence, a single host controller may verify different digital signatures and different data amounts and/or types associated with the digital signature. At the same time, it may be difficult for non-authorized third parties to tamper with the signed data. In other examples, specified data and digital signature metadata (addressed below) may take a relatively small amount of data space. In yet other examples, the specified data, the digital signature metadata, and the digital signature may be copied by non-authorized third parties, which may give the copied specified data, metadata, and digital signature the appearance of authorized data. In one practical example, the logic circuits may comprise microcontrollers attached, or configured to be attached, to print consumable cartridges, where the print apparatus logic circuits may comprise printer controllers and/or printer microcontrollers.

Figure 5A:
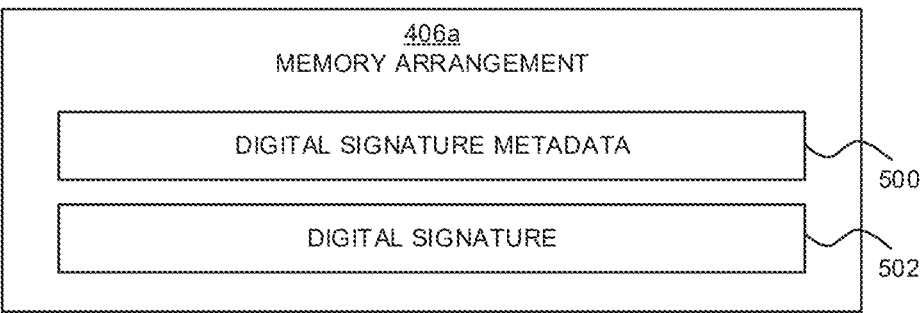
FIGS. 5A and 5B illustrate example memory arrangements.

FIG. 5A illustrates one example of a memory arrangement 406a. In some examples, memory arrangement 406a may be an example of memory arrangement 406 of FIG. 4. Memory arrangement 406a stores digital signature metadata 500 (also referred to herein as perso signature metadata) and a digital signature 502 (also referred to herein as perso signature) corresponding to the digital signature metadata 500. As will be described in more detail below with reference to FIG. 10, the digital signature metadata 500 and the digital signature

502 may be stored in a general use memory portion of the memory arrangement that may be accessed for read and write operations by a controller, for example, of a host. The digital signature metadata 500 is used to facilitate verification of the digital signature 502 (e.g., associated signed data) by a host. The digital signature metadata 500 may vary and will be defined in more detail below with reference to FIGS. 6A and 6B. The digital signature metadata 500 specifies the data used to compute the digital signature 502. The digital signature 502 is computed using the data corresponding to the digital signature metadata 500 and a private key corresponding to a public key stored by or accessible to the host. The computing of the digital signature 502 will be described in more detail below with reference to FIGS. 8A and 8B. To verify that a logic circuit is genuine, a host may read the digital signature metadata 500 and the digital signature 502. The host may then use data specified by the digital signature metadata 500 to validate the digital signature 502.

Figure 5B:
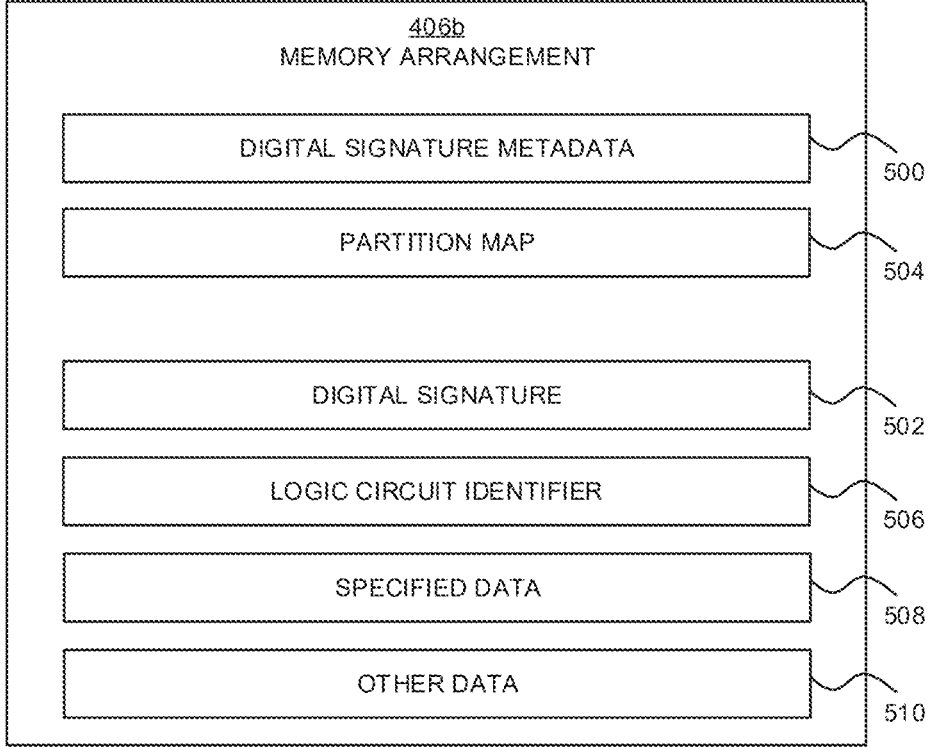

FIG. 5B illustrates another example of a memory arrangement 406b. In some examples, memory arrangement 406b may be another example of memory arrangement 406 of FIG. 4. Memory arrangement 406b stores digital signature metadata 500 and a digital signature 502 corresponding to the digital signature metadata 500 as previously described and illustrated with reference to FIG. 5A. In addition, memory arrangement 406b also stores a partition map 504, a logic circuit identifier 506, specified data 508 (also referred to herein as perso signature specified data), and other data 510. As will be described in more detail below with reference to FIG. 10, the partition map 504 and the logic circuit identifier 506 may be stored in an attribute memory portion of the memory arrangement that may be configured to be accessed for read operations by a host but not for write operations. An example of such partition map 504 is disclosed in U.S. Pat. No. 8,205,976B1 or international patent application number PCT/US2021/020262. In addition, the specified data 508 and the other data 510 may be stored in the general use memory portion of the memory arrangement that may be accessed for read and write operations by a host.

The partition map 504 includes metadata that defines partitions of the memory arrangement 406b, such as partitions of the general use memory portion of the memory arrangement. The digital signature metadata 500, the digital signature 502, the specified data 508, and the other data 510 are stored within the partitions of memory arrangement 406b defined by the partition map 504. The partition map 504 may include a plurality of partition lengths, read/write configurations, and partition attribute identifiers, each partition length, read/write configuration, and partition attribute identifier defining each partition of the general use memory portion of the memory arrangement. The read/write configuration may define how the corresponding partition is accessible, for example, for read only (RO) operations, write only (WO) operations, both read and write (R/W) operations, or write once to read only (W2RO) operations. Also other access modes can be defined by the partition read/write configuration, such as specifying whether authentication is required for partition access. The partition attribute identifier may define the type of data stored in the partition. For example, one attribute identifier value may indicate the partition where the perso signature is stored, and another attribute identifier value may indicate the partition where the perso signature metadata is stored. A host may query the partition map, and from the length and attribute identifier information, determine where the perso signature and the perso signature metadata are stored, and then construct appropriate read commands (which specify a memory address and length). The partition map 504 may have a variable length and may define a single partition or multiple partitions. In some examples, the partition map 504 may have a length of four bytes times the number of partitions, where each partition length is two bytes, each read/write configuration is one byte, and each partition attribute identifier is one byte.

The logic circuit identifier 506 enables a host to differentiate the logic circuitry package 402 (FIG. 4) from other logic circuitry packages. In some examples, each logic circuit identifier 506 may be unique, i.e., different for different logic circuitry packages. In instances where identifiers 506 are copied by unauthorized third parties, the logic circuit identifier 506 need not be universally unique because two or more instances of the same identifier 506 could exist. In some examples, the logic circuit identifier 506 has a length of 32 bytes.

The specified data 508 includes data stored in a plurality of data blocks of the general use memory portion of the memory arrangement as specified by the digital signature metadata 500. The specified data 508 includes data that is signed over. The digital signature 502 is at least partly based on the specified data 508. The digital signature 502 is not based on the other data 510. In some examples, the specified data may be static over the lifetime of the logic circuitry package and/or the component to which the logic circuitry package is attached (e.g., read only data). The specified data 508 may include any suitable data, such as certificates and/or data specific to the logic circuitry package. The specified data 508 may have a variable length between different logic circuit memory arrangements. In some examples, the specified data 508 may include the digital signature metadata 500, that is, one of the data blocks that is part of the specified data 508 may comprise the digital signature metadata 500

The other data 510 includes data that is not specified by the digital signature metadata 500. The other data 510 may include data unrelated to the digital signature 502, which is not signed over, including print cartridge related characteristics (e.g., color, fill level, etc.) and/or other suitable data. In some examples, the other data 510 may include data that is intended to be updated/changed by the host over the lifetime of the logic circuitry package (e.g., read/write data or write once to read only data) or the component the logic circuitry package is attached to, for example dynamic data that is updated over the lifetime of the logic circuit including data in a usage counter field or print material level data.

In some examples, the digital signature 502 is signed over data including at least one of a device type identifier, the logic circuit identifier 506, the partition map 504, and the specified data 508. The device type identifier, which is not stored in memory arrangement 406b, may correspond to the logic circuitry package 402 (FIG. 4) to identify that the logic circuitry package is intended to be attached to or is attached to a replaceable print apparatus component. In some examples, the value of the device type identifier is the same for all logic circuitry packages intended to be attached to or attached to a replaceable print apparatus component. Other values for the device type identifier may indicate that the logic circuitry package is not intended to be attached to a replaceable print apparatus component.

As described in more detail below, to verify that a logic circuit is genuine, a host may read the digital signature metadata 500, the digital signature 502, the partition map 504, and the logic circuit identifier 506. The host may then use the digital signature metadata 500 to read the specified data 508. The host may then use the partition map 504, the logic circuit identifier 506, and the specified data 508 to validate the digital signature 502. In one example, only portions of the partition map are verified for the validation, for example the partition lengths in the partition map and/or other features in the partition map.

Figure 6A:
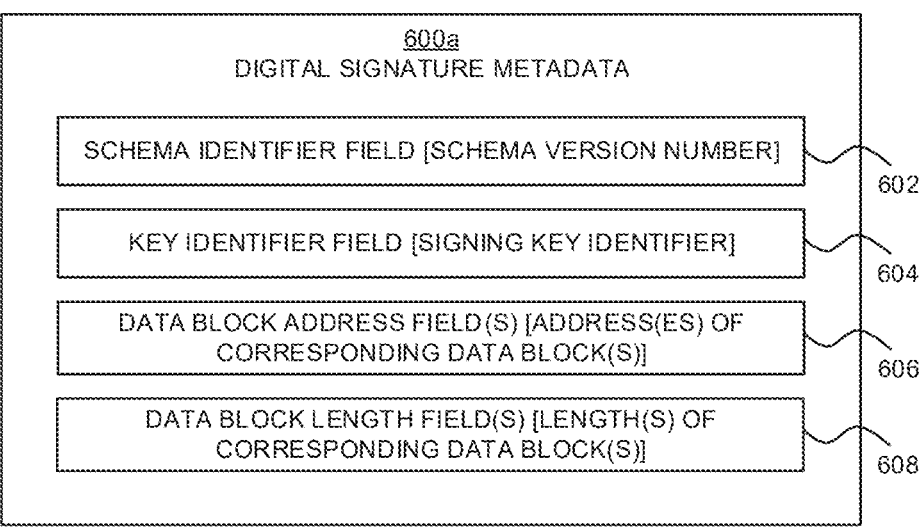
FIGS. 6A and 6B illustrate example digital signature metadata.

FIG. 6A illustrates one example of digital signature metadata 600a. In one example, digital signature metadata 600a provides digital signature metadata 500 of FIG. 5A or 5B. Digital signature metadata 600a includes a schema identifier field 602, a key identifier field 604, a data block address field(s) 606, and a data block length field(s) 608. The schema identifier field 602 stores a schema version for a host to determine which schema to use. The schema identifier field 602 may have a length of one byte. The key identifier field 604 stores an identifier of a signing key for the host to use the correct key for the verification. The host may store (or have accessible) a plurality of public keys used for verifying various signatures. The key identifier field 604 may have a length of two bytes. The original digital signature 502 (FIGS. 5A and 5B) may have been computed with the key that corresponds to the key identifier.

The data block address field(s) 606 may include a single data block address field or multiple data block address fields. Each data block address field stores an address corresponding to a data block over which a digital signature is originally computed. The data block address may be a start address of the data block. Each data block address field may have a length of two bytes. The data block length field(s) 608 may include a single data block length field or multiple data block length fields. Each data block length field corresponds to a data block addressed by a corresponding data block address field. Each data block length field stores data indicating the length of the corresponding data block. Each data block length field may have a length of two bytes. Each data block address field and corresponding data block length field may be concatenated within digital signature metadata 600a from a first data block address (addr$_1$) and data block length (len$_1$) to a last data block address (addr$_N$) and data block length (len$_N$) as follows: addr$_1$||len$_1$||addr$_2$||len$_2$|| . . . ||addr$_N$||len$_N$. In one example, one of the specified data blocks may store the digital signature metadata.

Figure 6B:
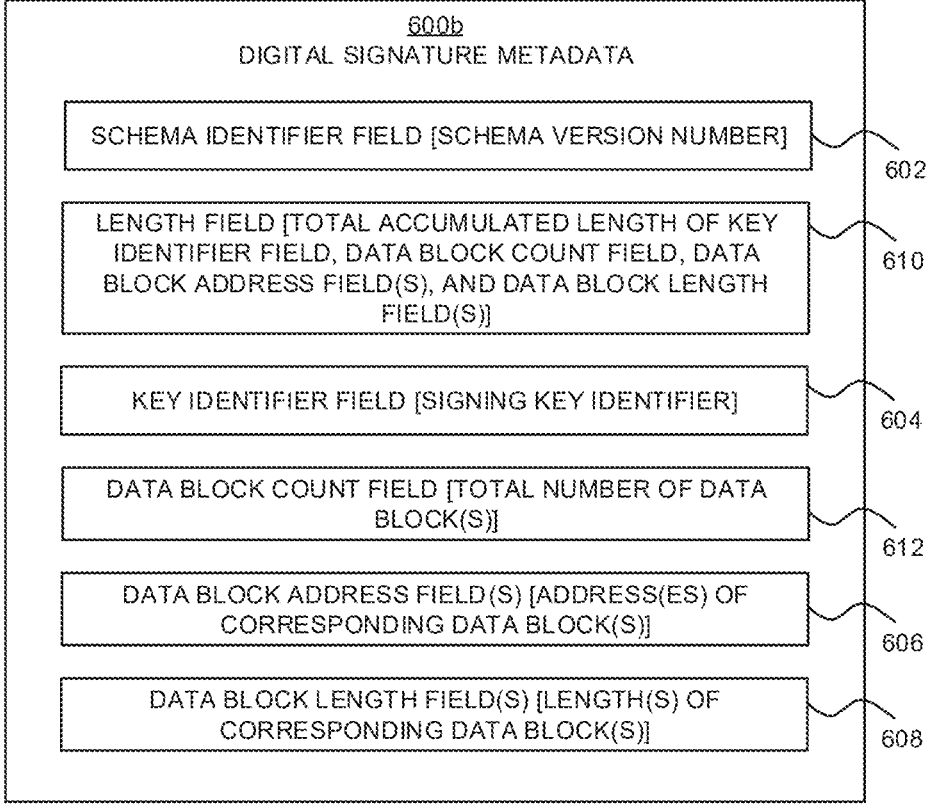
Figure 7D:
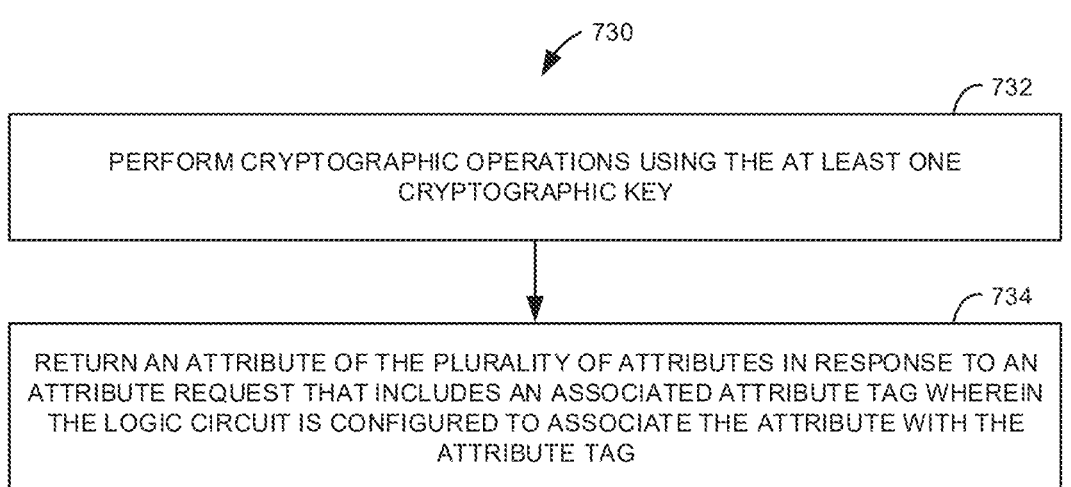

FIG. 6B illustrates another example of digital signature metadata 600b. In one example, digital signature metadata 600b provides digital signature metadata 500 of FIG. 5A or 5B. Digital signature metadata 600b includes a schema identifier field 602, a key identifier field 604, a data block address field(s) 606, and a data block length field(s) 608 as previously described and illustrated with reference to FIG. 6A. In addition, digital signature metadata 600b also includes a length field 610 and a data block count field 612. The data block count field 612 stores data indicating the total number of the data blocks addressed by the data block address field(s) 606. The data block count field 612 may have a length of one byte. The length field 610 stores data indicating the total accumulated length of the key identifier field 604, the data block count field 612, the data block address field(s) 606, and the data block length field(s) 608. The length field 610 may have a length of two bytes. A host may use the data stored in the length field 610 to parse the digital signature metadata 600b. In some examples, a host may use the data stored in the data block count field 612, instead of, or in addition to, the length field 610 to parse the digital signature metadata 600b.

The digital signature metadata 600b may be concatenated and written to memory arrangement 406 (FIG. 4) as follows: schema identifier||length||key identifier||data block count||addr$_1$||len$_1$||addr$_2$||len$_2$|| . . . ||addr$_N$||len$_N$. For example, given digital signature metadata 600b in hexadecimal equal to: 02 000B 8C00 02 0000 00F0 0100 0001, the schema identifier field 602 (i.e., 02) indicates a schema version number of 2, the length field 610 (i.e., 000B) indicates a total accumulated length of 11 bytes, the key identifier field 604 (i.e., 8C00) indicates a signing key identifier of 8C00, the data block count field 612 (i.e., 02) indicates two data blocks, the first data block address field 606 (i.e., 0000) and the first data block length field 608 (i.e., 00F0) indicates a first data block from 0x0000-0x00EF having a length of 240 bytes, and the second data block address field 606 (i.e., 0100) and the second data block length field 608 (i.e., 0001) indicates a second data block from 0x0100-0x0100 having a length of one byte.

FIGS. 7A-7D are flow diagrams illustrating example methods 700, 710, 720, and 730 that may be carried out by a logic circuit, such as logic circuit 404 of FIG. 4. The logic circuit may be part of a logic circuitry package (e.g., 402 of FIG. 4) for a replaceable print apparatus component (e.g., 400 of FIG. 4) including an interface (e.g., 408 of FIG. 4) to communicate with a print apparatus logic circuit (e.g., 304 of FIG. 3) as previously described. In this example, the memory arrangement stores digital signature metadata (e.g., 600a of FIG. 6A or 600b of FIG. 6B) to facilitate verification of associated signed data. As illustrated by method 700 of FIG. 7A at 702, the logic circuit is configured to receive a read request from the host. At 704, the logic circuit is configured to transmit the digital signature metadata to the host in response to the read request.

In one example, the memory arrangement stores the digital signature (e.g., 502 of FIG. 5A or 5B) corresponding to the digital signature metadata, signed with the key that corresponds to the key identifier (e.g., 604 of FIG. 6A or 6B). In this example, as illustrated by method 710 of FIG. 7B at 712, the logic circuit is configured to receive a read request (or a plurality of read requests) from the host. At 714, the logic circuit is configured to transmit the digital signature and the digital signature metadata (in any order) to the host in response to at least one read request.

In one example, the memory arrangement stores a logic circuit identifier (e.g., 506 of FIG. 5B), a partition map (e.g., 504 of FIG. 5B), digital signature metadata (e.g., 500 of FIG. 5B), specified data (e.g., 508 of FIG. 5B), and a digital signature (e.g., 502 of FIG. 5B) signed over data including a device type identifier corresponding to the logic circuitry package, the logic circuit identifier, the partition map, and the specified data. In this example, as illustrated by method 720 of FIG. 7C at 722, the logic circuit is configured to receive a request (e.g., general use memory read request(s) and/or attribute memory read request(s)) from the host. At 724, the logic circuit is configured to transmit to the host, the logic circuit identifier, the partition map, the digital signature, the digital signature metadata, and/or other data, and the specified data corresponding to the digital signature metadata in response to at least one request.

In one example, as will be described in more detail below with reference to FIG. 10, the digital signature metadata and the digital signature are stored in a general use memory portion of the memory arrangement configured for general purpose read/write access. In addition, the memory arrangement includes at least one different memory portion, not intended for general purpose read/write access, storing at least one cryptographic key and/or a plurality of attributes. In this case, as illustrated by method 730 of FIG. 7D at 732, the logic circuit may be configured to perform cryptographic operations using the at least one cryptographic key. At 734, the logic circuit is configured to return an attribute of the plurality of attributes in response to an attribute request that includes an associated attribute tag wherein the logic circuit is configured to associate the attribute with the attribute tag. The plurality of attributes may include, for example, the partition map, the logic circuit identifier, or a device address (e.g., for I2C communications). The logic circuit may be configured to implement one of blocks 732 and 734 or both of blocks 732 and 734.

Figure 8A:
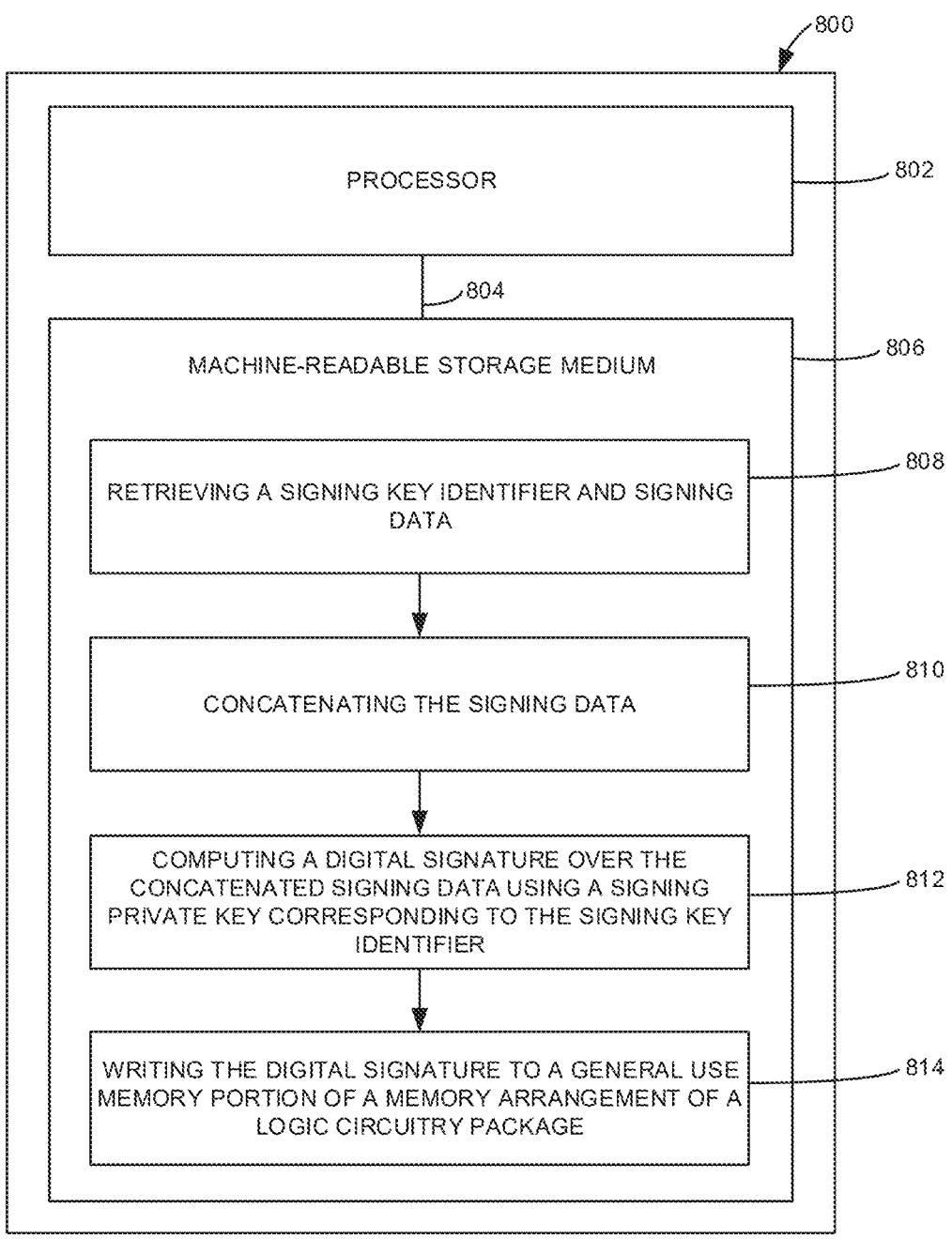

FIGS. 8A and 8B are block diagrams illustrating one example of a processing system 800 for provisioning a logic circuitry package (e.g., 402 of FIG. 4). In one example, processing system 800 may be part of a manufacturing line for logic circuitry packages. Processing system 800 includes a processor 802 and a machine-readable storage medium 806. Processor 802 is communicatively coupled to machine-readable storage medium 806 through a communication path 804. Although the following description refers to a single processor and a single machine-readable storage medium, the description may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 802 includes one (i.e., a single) central processing unit (CPU) or microprocessor or more than one (i.e., multiple) CPU or microprocessor, and/or other suitable hardware devices for retrieval and execution of instructions stored in machine-readable storage medium 806. Processor 802 may fetch, decode, and execute instructions 808-814 to provision a logic circuitry package.

Processor 802 may fetch, decode, and execute instructions 808 for retrieving a signing key identifier and signing data. In one example, the signing data includes a device type identifier corresponding to the logic circuitry package; a logic circuit identifier for the logic circuitry package for a host to differentiate the logic circuitry package from other logic circuitry packages; a partition map (e.g., including a partition length and a partition attribute identifier for each partition) to define partitions of a general use memory portion of the memory arrangement of the logic circuitry package; and data to be stored in a plurality of data blocks of the general use memory portion of the memory arrangement of the logic circuitry package as specified by digital signature metadata. The signing key identifier and the signing data may be stored in machine-readable storage medium 806 and/or in another machine-readable storage medium accessible by processing system 800.

The digital signature metadata is to facilitate verification of associated signed data. The digital signature metadata may include a schema identifier field (e.g., 602 of FIG. 6A or 6B) storing a schema version number for the host to determine which schema to use; a key identifier field (e.g., 604 of FIG. 6A or 6B) storing an identifier of a signing key for the host to use the correct key for the verification; a plurality of data block address fields (e.g., 606 of FIG. 6A or 6B), each data block address field of the plurality of data block address fields storing an address corresponding to a data block of a plurality of data blocks over which the digital signature is originally computed; and a plurality of data block length fields (e.g., 608 of FIG. 6A or 6B) corresponding to the plurality of data blocks, each data block length field of the plurality of data block length fields storing data indicating a length of the corresponding data block.

Processor 802 may fetch, decode, and execute instructions 810 for concatenating the signing data. The signing data may be concatenated as follows: device type identifier‖logic circuit identifier‖partition map‖data of data block 1‖data of data block 2‖ . . . ‖data of data block N, where "N" is the number of data blocks. Processor 802 may fetch, decode, and execute instructions 812 for computing a digital signature over the concatenated signing data using a signing private key corresponding to the signing key identifier. Processor 802 may fetch, decode, and execute instructions 814 for writing the digital signature (e.g., 502 of FIG. 5A or 5B) to the general use memory portion of the memory arrangement of the logic circuitry package.

As illustrated in FIG. 8B, processor 802 may fetch, decode, and execute further instructions 816 for writing the digital signature metadata (e.g., 500 of FIG. 5A or 5B) to the general use memory portion of the memory arrangement of the logic circuitry package. Processor 802 may fetch, decode, and execute further instructions 818 for writing the logic circuit identifier (e.g., 506 of FIG. 5B) and the partition map (e.g., 504 of FIG. 5B) to an attribute memory portion of the memory arrangement of the logic circuitry package. Processor 802 may fetch, decode, and execute further instructions 820 for writing the data (e.g., 508 of FIG. 5B) to be stored in the plurality of data blocks as specified by the digital signature metadata to the general use memory portion of the memory arrangement of the logic circuitry package.

As an alternative or in addition to retrieving and executing instructions, processor 802 may include one (i.e., a single) electronic circuit or more than one (i.e., multiple) electronic circuit comprising a number of electronic components for performing the functionality of one of the instructions or more than one of the instructions in machine-readable storage medium 806. With respect to the executable instruction representations (e.g., boxes) described and illustrated herein, it should be understood that part or all of the executable instructions and/or electronic circuits included within one box may, in alternate examples, be included in a different box illustrated in the figures or in a different box not shown.

Machine-readable storage medium 806 is a non-transitory storage medium and may be any suitable electronic, magnetic, optical, or other physical storage device that stores executable instructions. Thus, machine-readable storage medium 806 may be, for example, a random access memory (RAM), an electrically-erasable programmable read-only memory (EEPROM), a storage drive, an optical disc, and the like. Machine-readable storage medium 806 may be disposed within system 800, as illustrated in FIGS. 8A and 8B. In this case, the executable instructions may be installed on system 800. Alternatively, machine-readable storage medium 806 may be a portable, external, or remote storage medium that allows system 800 to download the instructions from the portable/external/remote storage medium. In this case, the executable instructions may be part of an installation package.

Figure 9:
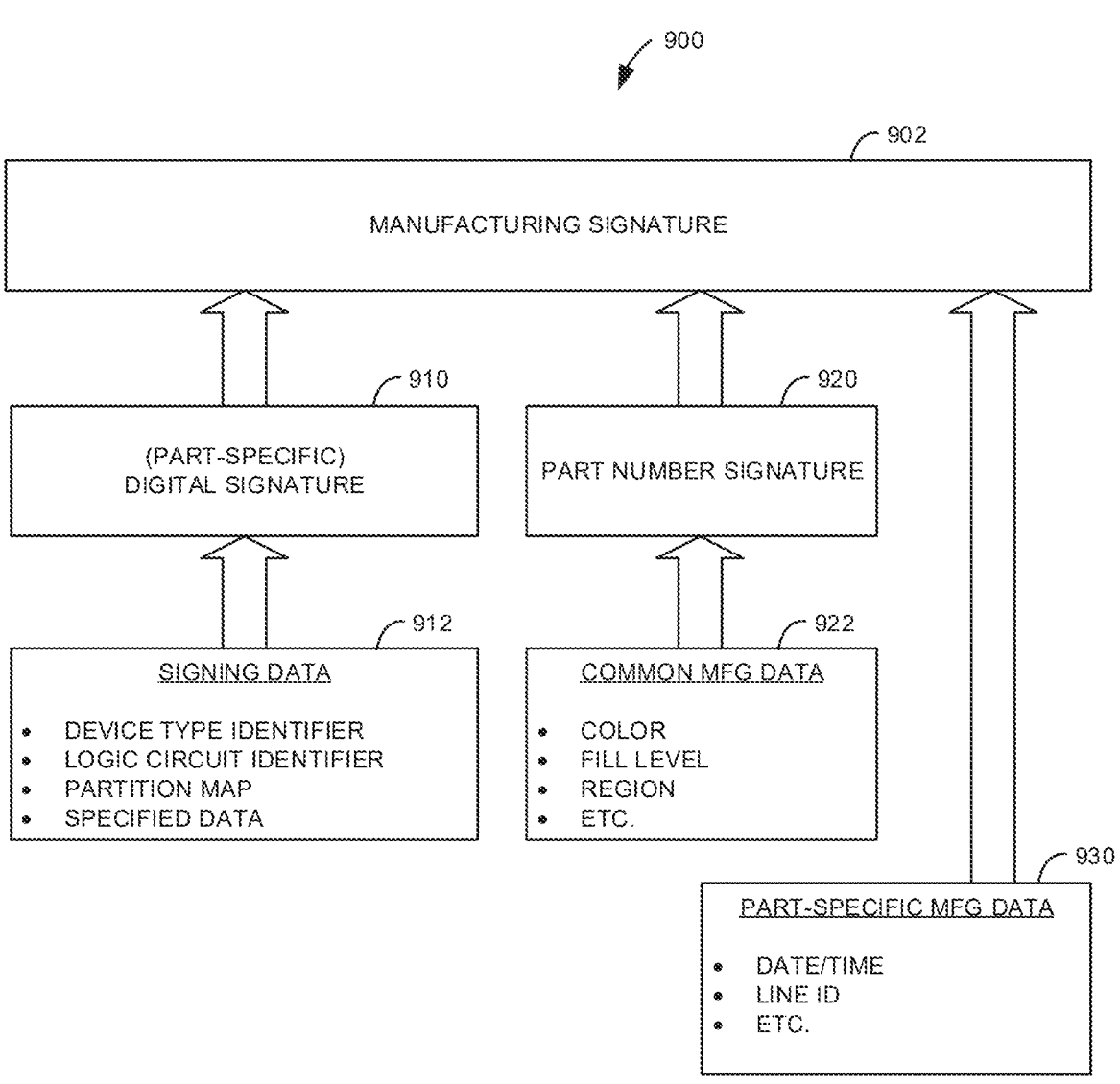
FIG. 9 is a block diagram illustrating one example of a signature hierarchy for a logic circuitry package.

FIG. 9 is a block diagram illustrating one example of a signature hierarchy 900 for a logic circuitry package, such as logic circuitry package 402 of FIG. 4, as implemented and/or stored on the logic circuit 400. Signature hierarchy 900 includes a manufacturing signature 902, which is computed over an (e.g., part-specific, static) digital signature 910, a part number signature 920, and part-specific manufacturing data 930. The part-specific manufacturing data 930 may include a date/time of the manufacturing of the component to which the logic circuit 400 is attached, a line identifier identifying a manufacturing line of the component to which the logic circuit 400 is attached, etc.

As previously described above, for example with respect to FIGS. 5A and 5B, the digital signature 910 (e.g., 502 of FIG. 5A or 5B, referred to as perso digital signature elsewhere in this disclosure) is computed over signing data 912 to provide signed data. The digital signature 910 may be computed using a first signing key corresponding to a first key identifier (e.g., 604 of FIG. 6A or 6B). In some examples, the digital signature 910 is unique to each logic circuitry package. The original digital signature 910 and the signing data 912 may be written to the memory arrangement of the logic circuitry package during provisioning of the logic circuitry package as previously described with reference to FIGS. 8A and 8B. The signing data 912 includes a device type identifier (which in some examples is not stored in the memory arrangement of the logic circuitry package), a logic circuit identifier (e.g., 506 of FIG. 5B), a partition map (e.g., 504 of FIG. 5B), and specified data (e.g., 508 of FIG. 5B). The private key for the digital signature 910 may reside in a hardware security module (HSM). The public key for the digital signature 910 may reside in, or be accessible by, the host. The same private/public keys may be used for signature generation and/or verification for multiple logic circuits.

The part number signature 920 is computed over common manufacturing data 922. The part number signature may be computed using a second signing key corresponding to a second key identifier (e.g., 1804 of FIG. 18A or 18B) different from the first signing key used to compute the digital signature 910. In some examples, the part number signature 920 may be common to a plurality of logic circuitry packages sharing the same part number (e.g., pertaining to a combination of logic circuitry packages, and/or the same family such as a replaceable print apparatus component family, the same color or a combination of colors, a certain fill level or certain fill levels, etc.). The part number signature 920 may be the same for a plurality of logic circuitry packages that have different digital signatures and different logic circuit identifiers (in certain instances, if the logic circuit identifiers are different then the digital signatures are consequently different). The part number signature 920 may be precomputed. The part number signature 920 and the common manufacturing data 922 may be written to the memory arrangement of the logic circuitry package during the final assembly of the replaceable print apparatus component. The common manufacturing data 922 may include a color, a fill level, a region, etc.

The manufacturing signature 902 may be computed by the logic circuit (e.g., 404 of FIG. 4) during the final assembly of the replaceable print apparatus component. The manufacturing signature 902 may be computed using a third signing key (e.g., 1106 of FIG. 11B) corresponding to a third key identifier (e.g., 1206 of FIG. 12B) different from the first signing key used to compute the digital signature 910 and different from the second signing key used to compute the part number signature. The manufacturing signature 902 may include a date and/or time of manufacture, a line ID and more part-specific manufacturing data that is written during the final assembly. As described in more detail below, the logic circuit may include dedicated functionality to compute the manufacturing signature including Elliptic-Curve Cryptography (ECC) keys that may be used to generate a manufacturing signature; a dedicated, configurable attribute that defines which ECC key should be used for signing and what data blocks should be signed; and dedicated commands to generate the signature, to write the dedicated attribute during personalization, and to read the dedicated attribute and signature. The private key for the manufacturing signature 902 may be generated by a personalization system and written to a key storage memory of the logic circuit. The public key for the manufacturing signature 902 is contained in a certificate generated by the personalization system and written to a general use memory of the logic circuit. Unique private/public keys may be used for signature generation and/or verification for each logic circuit.

Third parties and/or non-authorized parties can copy the digital signatures and metadata, including the signatures and data of FIG. 9, to have the effect of mimicking original and authorized data.

Figure 10:
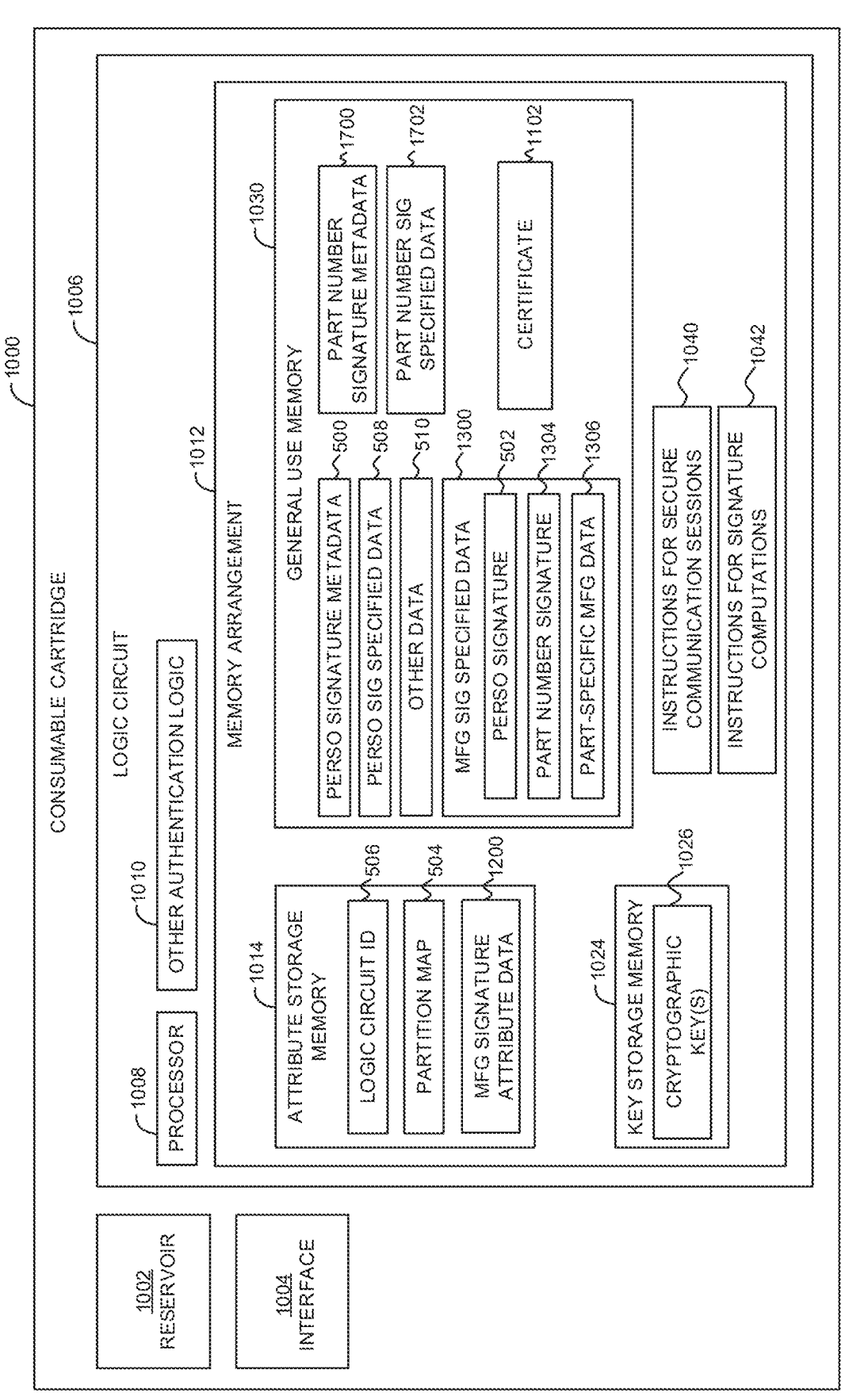
FIG. 10 illustrates one example of a consumable cartridge.

FIG. 10 illustrates one example of a consumable cartridge 1000. Consumable cartridge 1000 may provide the replaceable print apparatus component 104 of FIG. 1, the replaceable print apparatus component 200 of FIG. 2, or the print cartridge 400 of FIG. 4. Consumable cartridge 1000 includes a reservoir 1002 containing consumable material, a logic circuit interface 1004 to communicate with a host, and a logic circuit 1006. The consumable material may include ink, dry toner, liquid toner, or a 3D print agent. The reservoir 1002 may be connected to an output (not shown) to dispense the consumable material from reservoir 1002. Interface 1004 may be an I2C interface or another suitable interface for communicating with a host.

Logic circuit 1006 includes a processor 1008, other authentication logic 1010, and a memory arrangement 1012. Memory arrangement 1012 may include an attribute storage memory 1014, a key storage memory 1024, a general use memory 1030, and instructions 1040 and 1042. In one example, memory arrangement 1012 may include a single or multiple memory devices, and may include any or any combination of volatile memory (e.g., DRAM, SRAM, registers, etc.) and non-volatile memory (e.g., ROM, EEPROM, Flash, EPROM, memristor, etc.).

The attribute storage memory 1014 may store a logic circuit identifier 506, a partition map 504, and manufacturing signature attribute data 1200 (which will be described below with reference to FIGS. 12A and 12B). In some examples, the attribute storage memory 1014 is accessible for read and/or write access by processor 1008 and/or other authentication logic 1010. The attribute storage memory 1014 may be accessible only for read access by a host by sending requests to processor 1008, which may carry out the requested operations and return the requested data to the host. The key storage memory 1024 may store cryptographic key(s) 1026 (e.g., symmetric base key(s) and/or asymmetric private key(s)). In some examples, the key storage memory 1024 is accessible for read and write access by processor 1008 and/or other authentication logic 1010 and inaccessible to a host. The cryptographic key(s) 1026 may be used to perform cryptographic operations, such as authentication, signing, and/or other suitable operations. In some examples, the key storage memory 1024 stores a plurality of key identifiers and associated signing keys. Each signing key may be identified and selected based on its associated key identifier. In one example, the plurality of key identifiers and associated signing keys may be stored in a table or table-like format or any other format that facilitates identifying and retrieving a key based on a corresponding identifier. In another example, a single signing key may be stored with or without an associated identifier.

The general use memory 1030 may store personalization (perso) signature metadata 500 (e.g., digital signature metadata 500 of FIGS. 5A and 5B or digital signature metadata 600a or 600b of FIGS. 6A and 6B), perso signature specified data 508 (e.g., specified data 508 of FIG. 5B), and other data 510. The general use memory 1030 may also store a certificate 1102 and manufacturing signature specified data 1300 (also referred to herein as indicated data, which will be described below with reference to FIGS. 11A and 11B). In some examples, the certificate 1102 may be contained within the perso signature specified data 508. The certificate 1102 may be of the type described in international patent application number PCT/US2021/054017, which is incorporated herein by reference. The manufacturing signature specified data 1300 may include the perso signature 502 (e.g., digital signature 502 of FIGS. 5A and 5B), a part number signature 1304, and part-specific manufacturing data 1306 (e.g., corresponding to reference numbers 910, 920, and 930, respectively, of FIG. 9). In addition, the general use memory 1030 may also store part number signature metadata 1700 and part number signature specified data 1702 corresponding to the part number signature 1304. In some examples, the general use memory 1030 is accessible for read and/or write access by processor 1008, other authentication logic 1010, and/or a host via processor 1008. A host may access general use memory 1030 by transmitting general purpose read and/or write requests to logic circuit 1006 via interface 1004. General purpose read and/or write requests from a host to access the general use memory 1030 may be different from requests from a host to access attribute storage memory 1014.

Instructions 1040 are instructions for secure communication sessions between the logic circuit 1006 and a host based on a cryptographic key(s) 1026. Instructions 1042 are instructions for signature computations (e.g., a manufacturing signature 902 of FIG. 9) in response to a signature generation request from a host.

Processor 1008 executes instructions to control the operation of logic circuit 1006 including the instructions 1040 and 1042 and instructions for accessing memory arrangement 1012 for read and/or write operations. Processor 1008 may respond to external requests or commands from a host (e.g., through interface 1004) to return data (e.g., logic circuit identifier 506, partition map 504, perso signature metadata 500, perso signature 502, perso signature specified data 508, and other data 510, etc.), update data, and/or initiate a function (e.g., start a secure communication session, compute a signature, etc.). Processor 1008 may also respond to internal requests or commands within logic circuit 1006 to generate and/or update data stored within memory arrangement 1012. The other authentication logic 1010 may include high speed calculator logic to process predetermined iterative calculations and/or other logic to process authentication algorithms. In some examples, the other authentication logic 1010 may execute the instructions for secure communication sessions 1040 and/or instructions for signature computations 1042 or a portion of the instructions for secure communication sessions 1040 and/or instructions for signature computations 1042.

To avoid that data stored on a compatible logic circuit is different than original and/or authorized data, it is desirable that critical data stored on the consumable tied to identity or functionality be signed. The signed data is static over the remaining lifetime of the consumable device. As such, in many instances, signing is not appropriate for data where the value may change, such as print consumable usage counters.

Generating signatures over part-specific data in certain not directly controlled environments may be difficult. An example of a not directly controlled environment can be a manufacturing site of the component (e.g., replaceable print component such as reference numbers 1000, 104, 200) to which the logic circuitry package (e.g., 1006, 402, 204) is attached. These manufacturing sites may not be owned or directly operated by the party that designed and generated the architecture and content of the original data such as an OEM.

Logic circuits on certain components such as print consumables may perform the signing operation on their own by computing the manufacturing digital signature. For example, the manufacturing of a component with a print material or imaging function (e.g., photoconductor) may occur after the personalization of the associated logic circuit. The logic circuit personalization and the component manufacturing may occur at different sites and/or by different parties or suppliers. According to examples of this disclosure, during manufacturing of the component and/or after the personalization of the logic circuit, the manufacturing digital signature is computed by the logic circuit and stored in the memory arrangement of the logic circuit, for later retrieval by authorized host apparatuses (e.g., printers) that want to read and authenticate the signed data. Facilitating the logic circuits with a manufacturing signature signing function may facilitate that manufacturing lines may be able to perform this signing operation without requiring special equipment. Because the logic circuit is pre-configured to compute the manufacturing digital signature, the manufacturing digital signature and the data over which it is computed can be considered authentic, even though it is not necessarily signed in a directly controlled environment. These advantages can be of interest to OEMs.

Note that third parties, that are not OEMs of compatible host apparatuses, may still be able to copy the data and signatures disclosed herein. By storing equal or similar data and signatures, in accordance with examples of this disclosure, these third parties can connect to host apparatuses that are developed by other parties (e.g., said OEMs), whereby the host apparatuses may treat the received data as original data. In this context, it is noted that the manufacturing digital signature and the other signatures (e.g., perso signature, part number signature) disclosed herein may be unrelated to steps or parties associated with authorized manufacturing processes or sites. In addition, a non-authorized third party could copy the signatures and write them to a memory arrangement of a consumable in one step or action. In addition, or alternatively, a complete signature set (e.g., perso-, part number-, and manufacturing digital signatures) could be outsourced to a single supplier/manufacturer, not necessarily a non-authorized third party, and the consumable could follow the same schemas disclosed herein to be compatible with installed hosts (e.g., printers). The component, schemas, data and signatures, could be manufactured and/or written in a single site. In other words, the different signatures and data features of this disclosure are not limited by steps or a sequence of a manufacturing process. In certain instances, the various names (e.g., perso, manufacturing, part number, etc.) used to describe each digital signature disclosed herein are merely to differentiate the signatures from each other and the names do not imply that the signatures are to be written during any specific process step. The principles described in this disclosure may be used to, at least one of, (i) obtain control over data for a large quantity of logic circuits that passes through certain steps and/or sites of a manufacturing process, for example because one or some of these steps and/or sites could be difficult to fully control; and/or, (ii) obtain compatibility with pre-shipped/installed host controllers.

Note that certain examples of this disclosure, such as FIG. 10, describe an instance of the logic circuit where the manufacturing digital signature is already computed, whereas an earlier instantiation of the logic circuit (e.g., before component manufacture) may yet have to compute the manufacturing digital signature.

Figure 11A:
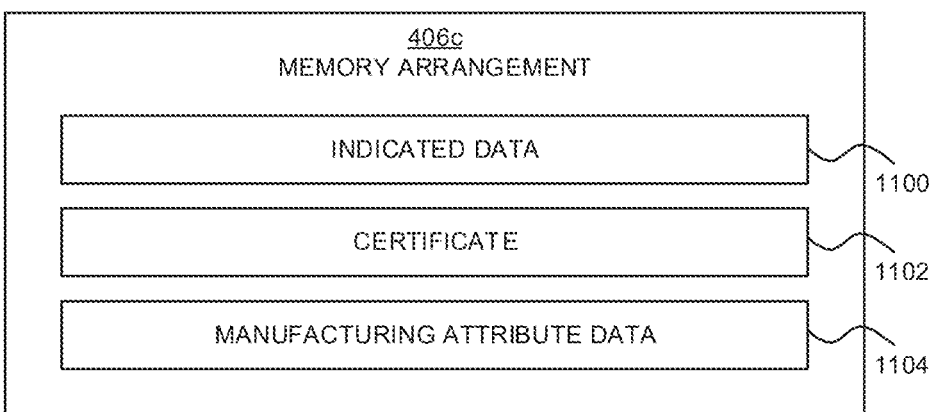
FIGS. 11A and 11B illustrate other example memory arrangements.

FIG. 11A illustrates another example of a memory arrangement 406c. In some examples, memory arrangement 406c may be an example of memory arrangement 406 of FIG. 4. Memory arrangement 406c stores indicated data 1100, a certificate 1102, and manufacturing attribute data 1104. The indicated data 1100 may be data over which the manufacturing digital signature is computed, as indicated by a corresponding indication (e.g. 1202) in the manufacturing attribute data 1104, such as is illustrated in FIG. 12A. As illustrated in FIG. 10, the indicated data 1100 (e.g., referred to therein as manufacturing signature specified data 1300) may be stored in a general use memory portion 1030 of the memory arrangement that may be accessed for read and write operations by a controller, for example, of a host. The certificate 1102 may also be stored in the general use memory portion of the memory arrangement. The manufacturing attribute data 1104 (e.g., also referred to therein as manufacturing signature attribute data 1200) may be stored in an attribute memory portion 1014 of the memory arrangement.

As will be described in more detail below, the indicated data 1100 is data over which a manufacturing digital signature is or is to be computed. The certificate 1102 is for a controller (e.g., of a host) to verify the manufacturing digital signature. The certificate 1102 includes a public key corresponding to the private key used to compute the manufacturing digital signature. The certificate 1102 is signed with a certificate authority private key to be verified by the controller (e.g., host) with a certificate authority public key. As will be described in more detail below, the manufacturing attribute data 1104 includes at least one indication indicating (e.g., identifying) the indicated data 1100 and the manufacturing digital signature.

Figure 11B:
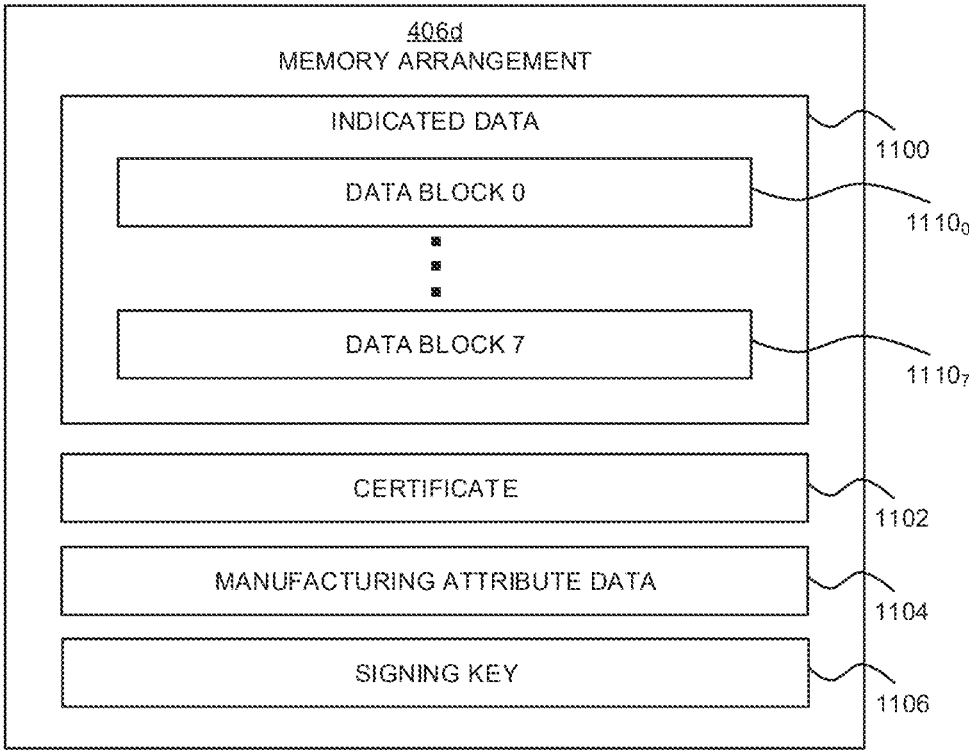

FIG. 11B illustrates another example of a memory arrangement 406d. In some examples, memory arrangement 406d may be another example of memory arrangement 406 of FIG. 4. Memory arrangement 406d stores indicated data 1100, certificate 1102, and manufacturing attribute data 1104 as previously described and illustrated with reference to FIG. 11A. In addition, memory arrangement 406d stores a signing key (e.g., private key) 1106 for computing the manufacturing digital signature. In this example, the indicated data 1100 includes data blocks $1110_0$ to $1110_7$. While in this example, the indicated data 1100 includes 8 data blocks $1110_0$ to $1110_7$, in other examples, the indicated data 1100 may include less than 8 data blocks, and in again other examples more than 8 data blocks could be used.

In some instances, at least one length and/or address of the indicated data 1100, which will be written during a subsequent manufacturing process step, is known in advance. For example, the address and length of each data block $1110_0$ to $1110_7$ of the indicated data may be predefined. However, all actual indicated data values that will be written may not be known in advance. During provisioning or personalization of a logic circuitry package prior to computing the manufacturing digital signature, the certificate 1102, the manufacturing attribute data 1104 (except for the manufacturing signature), and the signing key 1106 may be written to the memory arrangement 406d. The manufacturing attribute data 1104 can be configured as described below with reference to FIGS. 12A and 12B.

Figure 12A:
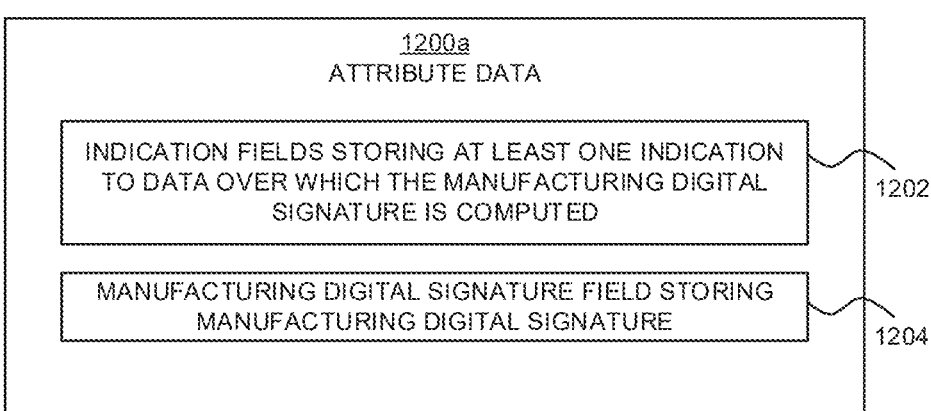
FIGS. 12A and 12B illustrate example attribute data for a manufacturing digital signature.

FIG. 12A illustrates one example of attribute data 1200a for a manufacturing digital signature. In one example, attribute data 1200a provides manufacturing attribute data 1104 of FIGS. 11A and 11B. Attribute data 1200a includes indication fields 1202 storing at least one indication to data over which the manufacturing digital signature is computed (e.g., at least one indication to indicated data 1100 of FIG. 11A or 11B, which includes at least one data block 1110) and a manufacturing digital signature field 1204 storing a manufacturing digital signature. In one example, the manufacturing digital signature field 1204 has a length of 64 bytes. The manufacturing digital signature field 1204 may remain empty until the manufacturing digital signature is computed, and stored in the field 1204, by the logic circuit 1006.

Figure 12B:
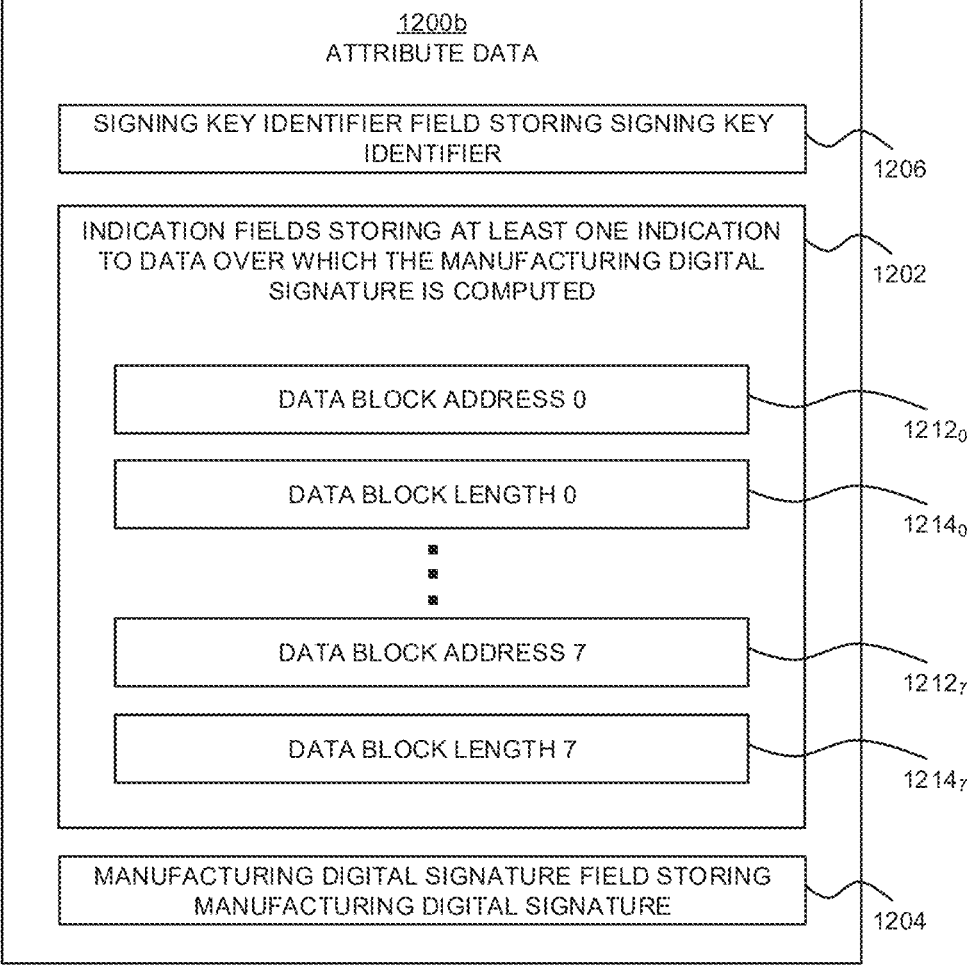

FIG. 12B illustrates a further example of attribute data 1200b for a manufacturing digital signature. In one example, attribute data 1200b provides manufacturing attribute data 1104 of FIGS. 11A and 11B. Attribute data 1200b includes indication fields 1202 storing at least one indication to data over which the manufacturing digital signature is computed and a manufacturing digital signature field 1204 storing a manufacturing digital signature as previously described and illustrated, for example with reference to FIG. 12A. In addition, attribute data 1200b includes a signing key identifier field 1206 storing a signing key identifier. The signing key identifier identifies (e.g., corresponds to) the signing key (e.g., 1106 of FIG. 11B) used to compute the manufacturing digital signature, for example as stored in the key storage memory 1024. The signing key identifier also corresponds to the certificate (e.g., 1102 of FIG. 11B) for the controller (e.g., host) to verify the manufacturing digital signature. In particular, the signing key identifier corresponds to the public key in the certificate. The certificate may also include the signing key identifier so that the controller can confirm that the controller is using the correct certificate to verify the manufacturing digital signature. In one example, the signing key identifier field 1206 has a length of 2 bytes.

Indication fields 1202 storing at least one indication to data over which the manufacturing digital signature is computed include data block address fields 12120 to 12127 and corresponding data block length fields 12140 to 12147. Each data block address field 12120 to 12127 stores the starting address of a respective data block $1110_0$ to $1110_7$ (FIG. 11B). Each data block length field 12140 to 12147 stores the length of the respective data block $1110_0$ to $1110_7$ (FIG. 11B). Thus, the data block address fields 12120 to 12127 and the corresponding data block length fields 12140 to 12147 identify the respective data blocks $1110_0$ to $1110_7$. In one example, each data block address field 12120 to 12127 has a length of 2 bytes, and each data block length field 12140 to 12147 has a length of 2 bytes.

In one example, the manufacturing attribute data 1200b is configured by transmitting a put attribute manufacturing signature command to the logic circuit. The command may specify from 1 to 8 data blocks. If fewer than 8 data blocks are specified, address and length values of 0 are stored for the unspecified blocks. The command may include the following command parameters: $attr\_tag\|rk\_id\|dblk_0\|\|\|dblk_{N-1}$, where $1 \le N \le 8$. The attr_tag is a manufacturing signature attribute tag and may have a length of 1 byte. The manufacturing signature attribute tag indicates that the command is to configure the manufacturing signature attribute data 1200b. The rk_id is a key identifier identifying the signing key for computing the manufacturing signature and may have a length of 2 bytes. The key identifier is stored in the signing key identifier field 1206. The $dblk_n$ identifies a data block n and may have a length of 4 bytes including a 2 byte address for the data block and a 2 byte length of the data block. The address and length of each data block n is stored in a corresponding data block address field 12120 to 12127 and data block length field 12140 to 12147, respectively.

The writing of the manufacturing data and the generation of the manufacturing signature might take place during a post-personalization manufacturing or configuration process, which may occur in an environment that is not under full control of the authority of the original data, such as a non-OEM operated manufacturing site. During the manufacturing process, the manufacturing data may be written as part of the indicated data 1100 (e.g., data is written to data blocks $1110_0$ to $1110_7$ of FIG. 11B) in a general use memory portion of the memory arrangement. With the manufacturing data written to the memory arrangement, the manufacturing signature may be computed and stored in the manufacturing digital signature field 1204. In one example, the manufacturing signature may be computed in response to the logic circuit receiving a generate manufacturing signature command.

The generate manufacturing signature command may be used to generate (e.g., compute) a manufacturing signature over one or more data blocks of the memory arrangement. The signing key and the data blocks over which the manufacturing signature is computed are specified in the manufacturing signature attribute data 1200$b$. Once generated, the manufacturing signature may be queried via the manufacturing signature attribute. In some examples, generating the manufacturing signature may cause a transition to the operational lifecycle state of the consumable (i.e., from a manufacturing state to a ready for use by a host state). In one example, the signing key may be used only once, such that once the manufacturing signature is computed, the manufacturing signature may never be computed again. In some examples, the signing key may be deleted once the manufacturing signature has been computed.

The manufacturing signature may be computed as follows: signature=ED25519–Sign((signing key), const||SHA-512 (mfg_data)), where:
  signing key corresponds to the key identifier specified in the manufacturing signature attribute data;

• mfg_data = $dblk_0$ || $data_0$ || ... || $dblk_{N-1}$ || $data_{N-1}$;

$dblk_n$ is data block n specified in the manufacturing signature attribute data; note that unused data blocks (i.e., those with length of 0) are not included; and
  $data_n$ is general use memory data corresponding to data block n.
It is noted that the manufacturing signature may be computed over a hash (e.g., SHA-512) of the at least one indication of indicated data (e.g., $dblk_n$) and the indicated data (e.g., $data_n$).

Figure 13:
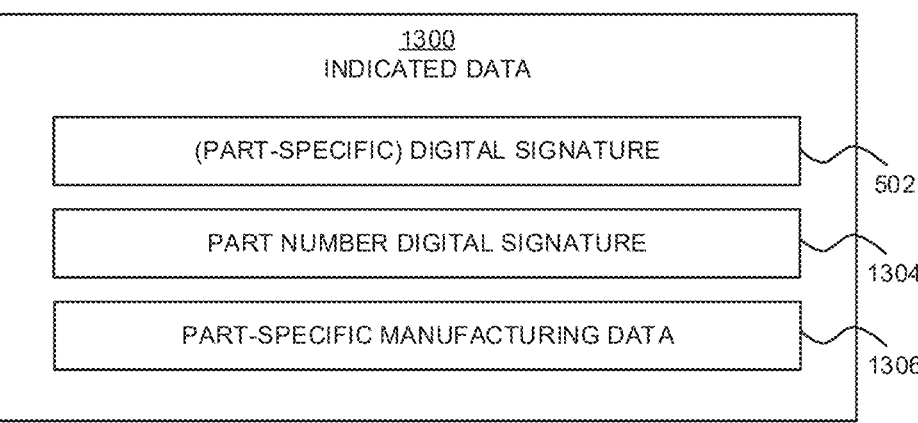
FIG. 13 illustrates one example of indicated data for a manufacturing digital signature.

FIG. 13 illustrates one example of indicated data 1300 for a manufacturing digital signature. In this example, indicated data 1300 includes the (part-specific) digital signature 502, also referred to as perso digital signature 502, the part number digital signature 1304, and the part-specific manufacturing data 1306. As previously described, the (part-specific) digital signature 502 is signed over data including at least one of a device type identifier corresponding to the logic circuitry package, a logic circuit identifier (e.g., 506 of FIG. 5B) for the host to differentiate the logic circuitry package from other logic circuitry packages, a partition map (e.g., 504 of FIG. 5B) to define partitions of a general use memory portion of the memory arrangement, and specified data (e.g., 508 of FIG. 5B) stored in the general use memory portion of the memory arrangement.

The part number digital signature 1304 is signed over common manufacturing data (e.g., 922 of FIG. 9) including at least one of a color, a fill level, and a region. The common manufacturing data may be common to a plurality of logic circuitry packages, i.e., not part-specific. The part-specific manufacturing data 1306 includes at least one of a date of manufacture, a time of manufacture, and a manufacturing line identifier (e.g., as indicated at 930 of FIG. 9). The (part-specific) digital signature 502, the part number digital signature 1304, and the part-specific manufacturing data 1306 may be stored in the data blocks $1110_0$ to $1110_7$ of the indicated data 1100 of FIG. 11B.

Figure 14:
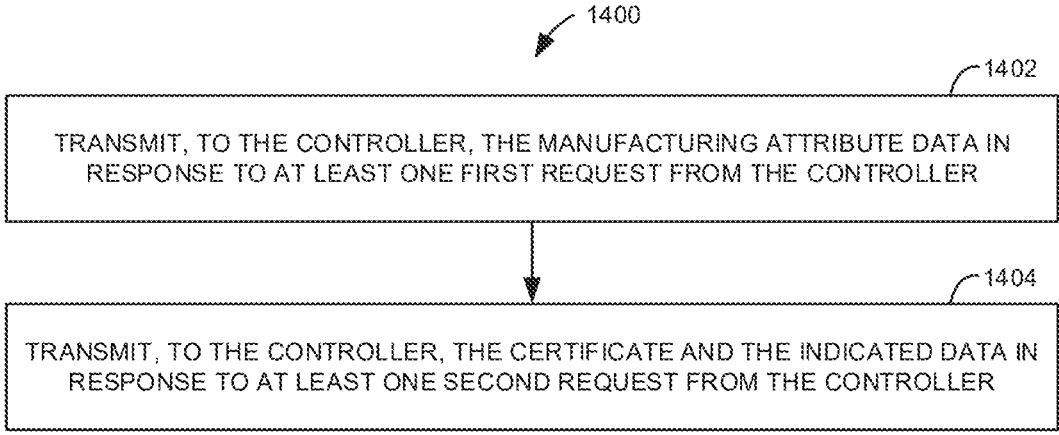
FIG. 14 is a flow diagram illustrating another example method that may be carried out by a logic circuit.

FIG. 14 is a flow diagram illustrating another example method 1400 that may be carried out by a logic circuit, such as logic circuit 404 of FIG. 4. The logic circuit may be part of a logic circuitry package (e.g., 402 of FIG. 4) for a replaceable print apparatus component (e.g., 400 of FIG. 4) including an interface (e.g., 408 of FIG. 4) to communicate with a controller (e.g., print apparatus logic circuit 304 of FIG. 3) as previously described. In this example, the memory arrangement stores indicated data (e.g., 1100 of FIG. 11A), a certificate (e.g., 1102 of FIG. 11A), and manufacturing attribute data (e.g., 1104 of FIG. 11A).

At 1402, the logic circuit is configured to transmit, to the controller, the manufacturing attribute data in response to at least one first request from the controller. The manufacturing attribute data includes the key identifier (e.g., 1206 of FIG. 12B), the at least one indication to data over which the manufacturing digital signature is computed (e.g., 1202 of FIG. 12B), and the manufacturing digital signature (e.g., 1204 of FIG. 12B). At 1404, the logic circuit is configured to transmit, to the controller, the certificate and the indicated data in response to at least one second request from the controller. In one example, the at least one first request and the at least one second request have differently encoded command type fields and/or include different opcodes, indicating different command types. For example, the at least one first request might be configured to query attribute memory (e.g., 1014 of FIG. 10) and the at least one second request might be configured to read general use memory (e.g., 1030 of FIG. 10). For example, depending on certain technical limitations or for other reasons, a plurality of transmissions may be needed to transmit requested data to the controller, so that correspondingly also a plurality of requests may be transmitted from the controller to the logic circuit. The at least one first request may comprise a plurality of first requests, and/or the at least one second request may comprise a plurality of second requests. Correspondingly, a plurality of responses may be transmitted, for example of 32 bytes each, to transmit a complete data set, for example of 64 bytes.

Figure 15:
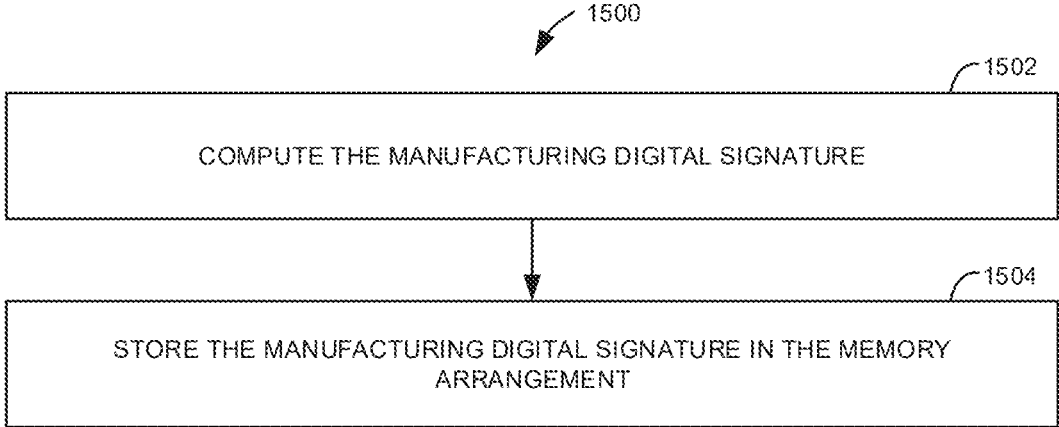
FIG. 15 is a flow diagram illustrating another example method that may be carried out by a logic circuit.

FIG. 15 is a flow diagram illustrating another example method 1500 that may be carried out by a logic circuit, such as logic circuit 404 of FIG. 4. The logic circuit may be part of a logic circuitry package (e.g., 402 of FIG. 4) for a replaceable print apparatus component (e.g., 400 of FIG. 4) including an interface (e.g., 408 of FIG. 4) to communicate with a host (e.g., print apparatus logic circuit 304 of FIG. 3) as previously described. In this example, the memory arrangement stores a signing key (e.g., 1106 of FIG. 11B) and a key identifier (e.g., 1206 of FIG. 12B).

At 1502, the logic circuit is configured to compute the manufacturing digital signature. The manufacturing digital signature is computed based on the attribute data (e.g., 1200$b$ of FIG. 12B). The manufacturing digital signature is computed over the data stored in data blocks $1110_0$ to $1110_7$ of FIG. 11B using the signing key 1106 of FIG. 11B identified by the signing key identifier 1206 of FIG. 12B. At 1504, the logic circuit is configured to store the manufacturing digital signature in the memory arrangement. The manufacturing digital signature is stored in the manufacturing digital signature field 1204 of the attribute data 1200a of FIG. 12A or 1200b of FIG. 12B, for example in attribute storage memory 1014 of FIG. 10.

FIG. 16 is a flow diagram illustrating one example of a method 1600 for provisioning a logic circuitry package (e.g., 402 of FIG. 4) comprising a memory arrangement (e.g., 406 of FIG. 4). At 1602, method 1600 includes receiving, by a logic circuit (e.g., 404) of the logic circuitry package, a command to generate a manufacturing digital signature. At 1604, method 1600 includes reading, by the logic circuit in response to the command, a signing key identifier (e.g., 1206 of FIG. 12B) and at least one indication (e.g., 1202 of FIG. 12B) of indicated data (e.g., 1100 of FIG. 11A or 11B) stored in a memory arrangement of the logic circuitry package. At 1606, method 1600 includes reading, by the logic circuit, a signing key (e.g., 1106 of FIG. 11B) corresponding to the signing key identifier.

At 1608, method 1600 includes reading, by the logic circuit, the indicated data based on the at least one indication. In one example, the indicated data is stored in a general use memory portion (e.g., 1030 of FIG. 10) of the memory arrangement configured for general purpose read/write access. The indicated data may include a part-specific digital signature (e.g., 502 of FIG. 5B) signed over data comprising at least one of a device type identifier corresponding to the logic circuitry package, a logic circuit identifier (e.g., 506 of FIG. 5B) to differentiate the logic circuitry package from other logic circuitry packages, a partition map (e.g., 504 of FIG. 5B) to define partitions of a general use memory portion of the memory arrangement, and specified data (e.g., 508 of FIG. 5B) stored in the general use memory portion of the memory arrangement.

In some examples, the logic circuitry package may be attached to a replaceable print cartridge (e.g., 400 of FIG. 4). In this example, the indicated data may include a part number digital signature (e.g., 1304 of FIG. 13) signed over common manufacturing data (e.g., 922 of FIG. 9) including at least one of a color, a fill level, and a region. Also in this example, the indicated data may include part-specific manufacturing data (e.g., 1306 of FIG. 13) including at least one of a date of manufacture of the replaceable print cartridge, a time of manufacture of the replaceable print cartridge, and a line identifier identifying the manufacturing line of the replaceable print cartridge (e.g., as indicated at 930 of FIG. 9).

At 1610, method 1600 includes computing, by the logic circuit, a manufacturing digital signature based on the indicated data using the signing key. At 1612, method 1600 includes writing, by the logic circuit, the manufacturing digital signature to the memory arrangement (e.g., to field 1204 of FIG. 12A or 12B). In one example, writing the manufacturing digital signature may include writing the manufacturing digital signature to an attribute memory portion (e.g., 1014 of FIG. 10) of the memory arrangement. The logic circuit may be configured to provide a host with read only access to some attributes (e.g., the manufacturing signature attribute) stored in the attribute memory portion.

The above described manufacturing digital signature architecture and its generation process may allow for authentication of common and/or part specific manufacturing data written to a consumable in a semi-trusted, or at least not fully controlled, environment. The process and architecture may support the ability to generate the digital signatures without needing to build complex infrastructure to create/support on-site or off-site signing services. The process allows a flexible method for specifying data to be included in the manufacturing digital signature and allows binding of manufacturing data with other data previously written to the memory arrangement, such as during provisioning or personalization of the logic circuitry package prior to computing the manufacturing digital signature. In addition, the process forces aftermarket consumables to use copies of complete data sets from genuine consumables, instead of using non-genuine data, making it easier to identify and alert customers to the presence of non-genuine consumables.

Figure 17A:
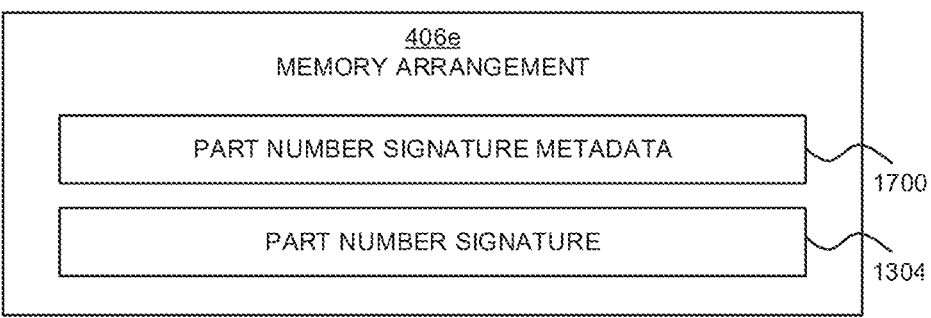
FIGS. 17A and 17B illustrate other example memory arrangements.

FIG. 17A illustrates one example of a memory arrangement 406e. In some examples, memory arrangement 406e may be an example of memory arrangement 406 of FIG. 4. Memory arrangement 406e stores part number signature metadata 1700 and a part number signature 1304 corresponding to the part number signature metadata 1700. As described above with reference to FIG. 10, the part number signature metadata 1700 and the part number signature 1304 may be stored in a general use memory portion 1030 of the memory arrangement that may be accessed for read and write operations by a controller, for example, of a host. The part number signature metadata 1700 is used to facilitate verification of the part number signature 1304 (e.g., associated signed data) by a host. The part number signature metadata 1700 may vary and will be defined in more detail below with reference to FIGS. 18A and 18B. The part number signature metadata 1700 specifies the data used to compute the part number signature 1304. The part number signature 1304 is computed using the data corresponding to the part number signature metadata 1700 and a private key corresponding to a public key stored by or accessible to the host. The computing of the part number signature 1304 will be described in more detail below with reference to FIGS. 20A and 20B. To verify that a logic circuit is genuine, a host may read the part number signature metadata 1700 and the part number signature 1304. The host may then use data specified by the part number signature metadata 1700 to validate the part number signature 1304.

Figure 17B:
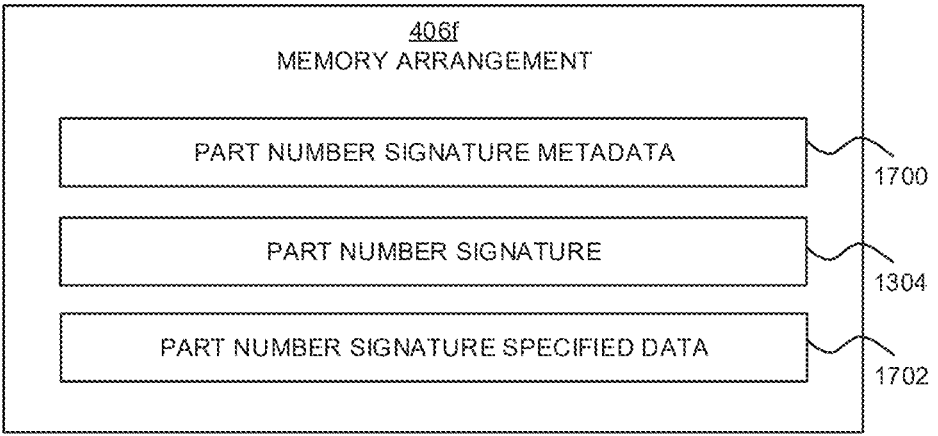

FIG. 17B illustrates another example of a memory arrangement 406f. In some examples, memory arrangement 406f may be another example of memory arrangement 406 of FIG. 4. Memory arrangement 406f stores part number signature metadata 1700 and a part number signature 1304 corresponding to the part number signature metadata 1700 as previously described and illustrated with reference to FIG. 17A. In addition, memory arrangement 406f also stores part number signature specified data 1702. As described above with reference to FIG. 10, the part number signature specified data 1702 may be stored in the general use memory portion 1030 of the memory arrangement that may be accessed for read and write operations by a host.

The part number signature specified data 1702 includes data stored in a plurality of data blocks of the general use memory portion of the memory arrangement as specified by the part number signature metadata 1700. The part number signature specified data 1702 includes data that is signed over. The part number signature 1304 is at least partly based on the part number signature specified data 1702. In some examples, the part number signature specified data may be static over the lifetime of the logic circuitry package and/or the component to which the logic circuitry package is attached (e.g., read only data). The part number signature specified data 1702 may include common manufacturing data (e.g., 922 of FIG. 9) as previously described that is common to multiple replaceable print cartridges (e.g., print cartridges having the same SKU). The part number signature specified data 1702 may have a variable length between different logic memory arrangements. In some examples, the part number signature specified data 1702 may include the part number signature metadata 1700, that is, one of the data blocks that is part of the part number signature specified data 1702 may comprise the part number signature metadata 1700.

In some examples, the part number signature 1304 is signed over data including at least one of a device type identifier and the part number signature specified data 1702. The device type identifier, which is not stored in memory arrangement 406f, may correspond to the logic circuitry package 402 (FIG. 4) to identify that the logic circuitry package is intended to be attached to or is attached to a replaceable print apparatus component. In some examples, the value of the device type identifier is the same for all logic circuitry packages intended to be attached to or attached to a replaceable print apparatus component. The device type identifier which is signed over when computing the part number signature may be the same or different from the device type identifier which is signed over when computing the perso signature.

As described in more detail below, to verify that a logic circuit is genuine, a host may read the part number signature metadata 1700 and the part number signature 1304. The host may then use the part number signature metadata 1700 to read the part number signature specified data 1702. The host may then use the part number signature specified data 1702 to validate the part number signature 1304. In some examples, the part number signature 1304 and the part number signature metadata 1700 may be configured according to a schema similar to the schema used for the digital signature (e.g., perso signature) and the digital signature metadata (e.g., perso signature metadata) as previously described and illustrated with reference to FIGS. 5A-5B and 6A-6B.

Figure 18A:
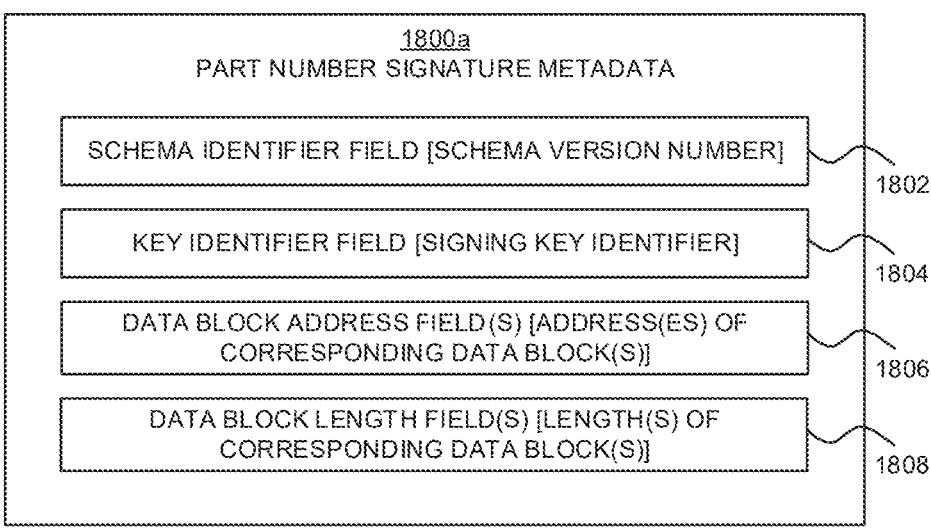
FIGS. 18A and 18B illustrate example part number signature metadata.

FIG. 18A illustrates one example of part number signature metadata 1800a. In one example, part number signature metadata 1800a is part number signature metadata 1700 of FIG. 17A or 17B. Part number signature metadata 1800a includes a schema identifier field 1802, a key identifier field 1804, a data block address field(s) 1806, and a data block length field(s) 1808. The schema identifier field 1802 stores a schema version for a host to determine which schema to use. The schema identifier field 1802 may have a length of one byte. The key identifier field 1804 stores an identifier of a signing key for the host to use the correct key for the verification. The key identifier field 1804 may have a length of two bytes. The original part number signature 1304 (FIGS. 17A and 17B) may have been computed with the key that corresponds to the key identifier.

The data block address field(s) 1806 may include a single data block address field or multiple data block address fields. Each data block address field stores a starting address corresponding to a data block over which a part number signature is originally computed. Each data block address field may have a length of two bytes. The data block length field(s) 1808 may include a single data block length field or multiple data block length fields. Each data block length field corresponds to a data block addressed by a corresponding data block address field 1806. Each data block length field stores data indicating the length of the corresponding data block. Each data block length field may have a length of two bytes. Each data block address field and corresponding data block length field may be concatenated within part number signature metadata 1800a from a first data block address ($addr_1$) and data block length ($len_1$) to a last data block address ($addr_N$) and data block length ($len_N$) as follows: $addr_1 \| len_1 \| addr_2 \| len_2 \| \ldots \| addr_N \| len_N$. In one example, one of the specified data blocks may store the part number signature metadata.

Figure 18B:
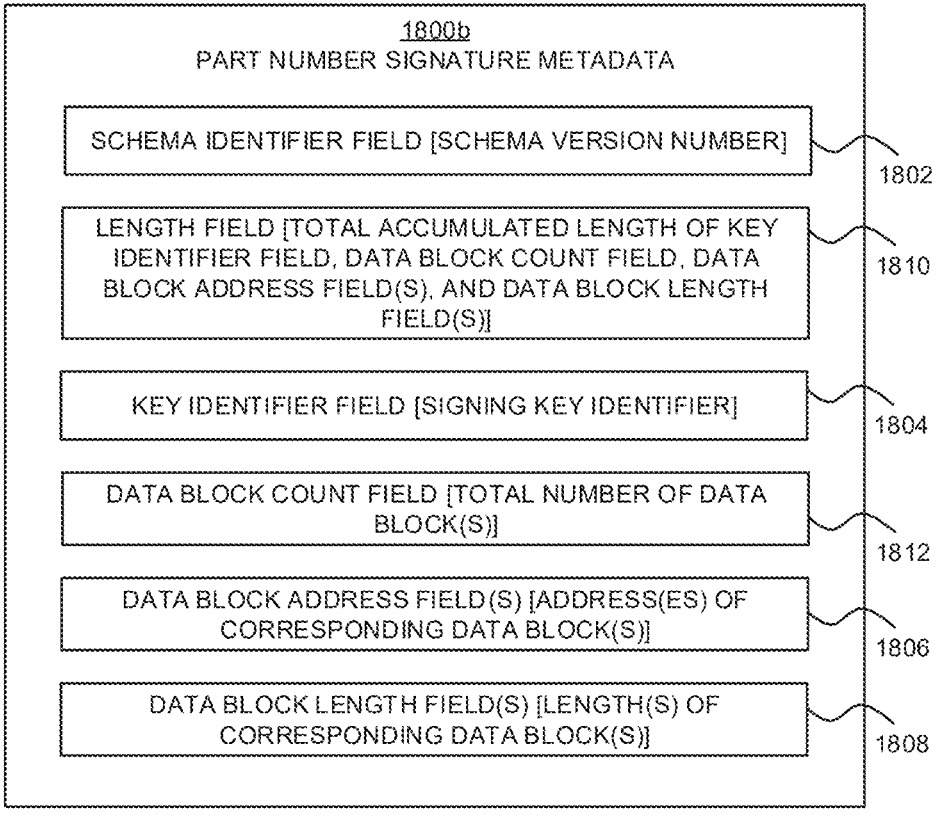

FIG. 18B illustrates another example of part number signature metadata 1800b. In one example, part number signature metadata 1800b is part number signature metadata 1700 of FIG. 17A or 17B. Part number signature metadata 1800b includes a schema identifier field 1802, a key identifier field 1804, a data block address field(s) 1806, and a data block length field(s) 1808 as previously described and illustrated with reference to FIG. 18A. In addition, part number signature metadata 1800b also includes a length field 1810 and a data block count field 1812. The data block count field 1812 stores data indicating the total number of the data blocks addressed by the data block address field(s) 1806. The data block count field 1812 may have a length of one byte. The length field 1810 stores data indicating the total accumulated length of the key identifier field 1804, the data block count field 1812, the data block address field(s) 1806, and the data block length field(s) 1808. The length field 1810 may have a length of two bytes. A host may use the data stored in the length field 1810 to parse the part number signature metadata 1800b. In some examples, a host may use the data stored in the data block count field 1812, instead of, or in addition to, the length field 1810 to parse the part number signature metadata 1800b. The part number signature metadata 1800b may be concatenated and written to memory arrangement 406 (FIG. 4) as follows: schema identifier \| length \| key identifier \| data block count \| $addr_1 \| len_1 \| addr_2 \| len_2 \| \ldots \| addr_N \| len_N$.

FIGS. 19A-19C are flow diagrams illustrating example methods 1900, 1910, and 1920 that may be carried out by a logic circuit, such as logic circuit 404 of FIG. 4. The logic circuit may be part of a logic circuitry package (e.g., 402 of FIG. 4) for a replaceable print apparatus component (e.g., 400 of FIG. 4) including an interface (e.g., 408 of FIG. 4) to communicate with a print apparatus logic circuit (e.g., 304 of FIG. 3) as previously described. In this example, the memory arrangement stores part number signature metadata (e.g., 1800a of FIG. 18A or 1800b of FIG. 18B) to facilitate verification of associated signed data. As illustrated by method 1900 of FIG. 19A at 1902, the logic circuit is configured to receive a read request from the host. At 1904, the logic circuit is configured to transmit the part number signature metadata to the host in response to the read request.

In one example, the memory arrangement stores the part number signature (e.g., 1304 of FIG. 17A or 17B) corresponding to the part number signature metadata, signed with the key that corresponds to the key identifier (e.g., 1804 of FIG. 18A or 18B). In this example, as illustrated by method 1910 of FIG. 19B at 1912, the logic circuit is configured to receive a read request (or a plurality of read requests) from the host. At 1914, the logic circuit is configured to transmit the part number signature and the part number signature metadata (in any order) to the host in response to at least one read request.

In one example, the memory arrangement stores part number signature metadata (e.g., 1700 of FIG. 17B), part number signature specified data (e.g., 1702 of FIG. 17B), and a part number signature (e.g., 1304 of FIG. 17B) signed over data including a device type identifier corresponding to the logic circuitry package and the part number signature specified data. In this example, as illustrated by method

1920 of FIG. 19C at 1922, the logic circuit is configured to receive a request (e.g., general use memory read request(s)) from the host. At 1924, the logic circuit is configured to transmit to the host, the part number signature, the part number signature metadata, and/or other data, and the part number signature specified data corresponding to the part number signature metadata in response to at least one request.

Figure 20A:
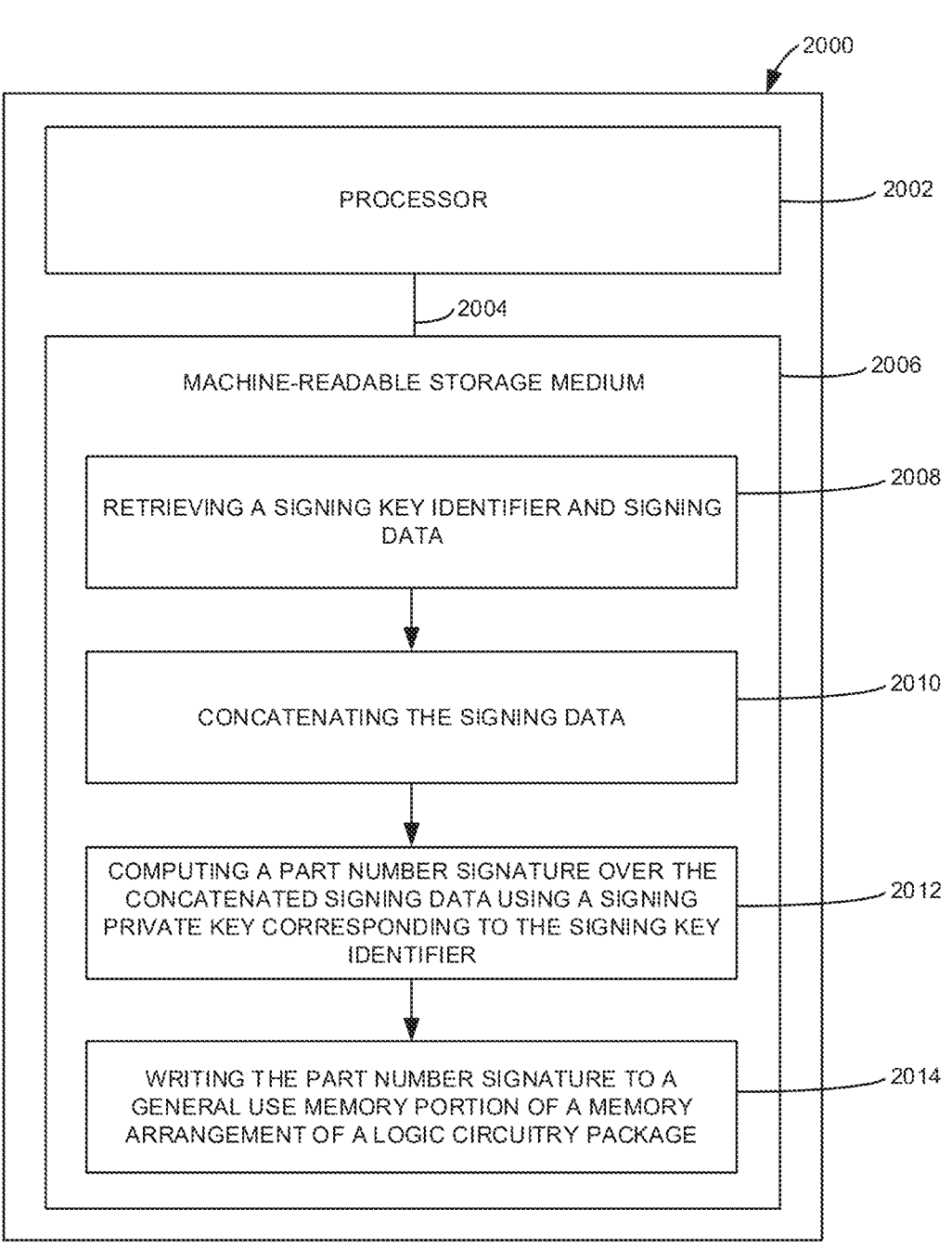
FIGS. 20A and 20B are block diagrams illustrating another example of a processing system for provisioning a logic circuitry package.
Figure 20B:
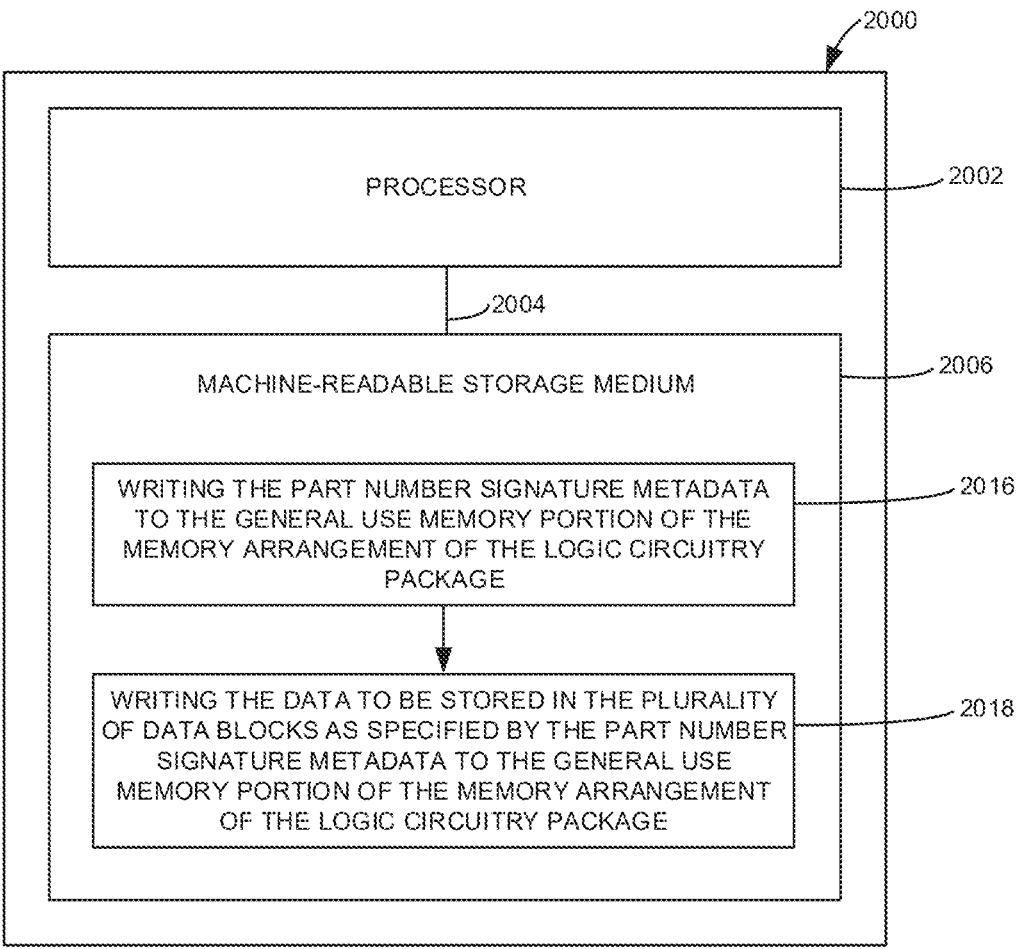

FIGS. 20A and 20B are block diagrams illustrating another example of a processing system 2000 for provisioning a logic circuitry package (e.g., 402 of FIG. 4). In some examples, processing system 2000 may be distributed across at least two sites. For example, at a first site processing system 2000 may pre-compute a set of part number signatures corresponding to the data for a plurality of predefined part numbers. These data sets (i.e., part number signing data and part number signature) may then be sent to a second (e.g., manufacturing) site where the manufacturing data is written to logic circuitry packages on a manufacturing line. When the manufacturing line is configured to run a certain part number, the appropriate data set may be selected and written by processing system 2000 to the memory arrangements of the logic circuitry packages, as further described below. In one example, processing system 2000 may be different from processing system 800 previously described and illustrated with reference to FIGS. 8A and 8B. Processing system 2000 includes a processor 2002 and a machine-readable storage medium 2006. Processor 2002 is communicatively coupled to machine-readable storage medium 2006 through a communication path 2004. Although the following description refers to a single processor and a single machine-readable storage medium, the description may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 2002 includes one (i.e., a single) central processing unit (CPU) or microprocessor or more than one (i.e., multiple) CPU or microprocessor, and/or other suitable hardware devices for retrieval and execution of instructions stored in machine-readable storage medium 2006. Processor 2002 may fetch, decode, and execute instructions 2008-2014 to provision a logic circuitry package.

Processor 2002 may fetch, decode, and execute instructions 2008 (e.g., at a first site) for retrieving a signing key identifier and signing data. In one example, the signing data includes a device type identifier corresponding to the logic circuitry package and data to be stored in a plurality of data blocks of the general use memory portion of the memory arrangement of the logic circuitry package as specified by part number signature metadata. The signing key identifier and the signing data may be stored in machine-readable storage medium 2006 and/or in another machine-readable storage medium accessible by processing system 2000.

The part number signature metadata is to facilitate verification of associated signed data. The part number signature metadata may include a schema identifier field (e.g., 1802 of FIG. 18A or 18B) storing a schema version number for the host to determine which schema to use; a key identifier field (e.g., 1804 of FIG. 18A or 18B) storing an identifier of a signing key for the host to use the correct key for the verification; a plurality of data block address fields (e.g., 1806 of FIG. 18A or 18B), each data block address field of the plurality of data block address fields storing an address corresponding to a data block of a plurality of data blocks over which the part number signature is originally computed; and a plurality of data block length fields (e.g., 1808 of FIG. 18A or 18B) corresponding to the plurality of data blocks, each data block length field of the plurality of data block length fields storing data indicating a length of the corresponding data block.

Processor 2002 may fetch, decode, and execute instructions 2010 (e.g., at the first site) for concatenating the signing data. The signing data may be concatenated as follows: device type identifier‖data of data block 1‖data of data block 2‖ . . . ‖data of data block N, where "N" is the number of data blocks. Processor 2002 may fetch, decode, and execute instructions 2012 (e.g., at the first site) for computing a part number signature over the concatenated signing data using a signing private key corresponding to the signing key identifier. In one example, computing the part number signature comprises computing the part number signature over a hash of the data to be stored in the plurality of data blocks. Processor 2002 may fetch, decode, and execute instructions 2014 (e.g., at a second site) for writing the part number signature (e.g., 1304 of FIG. 17A or 17B) to the general use memory portion of the memory arrangement of the logic circuitry package.

As illustrated in FIG. 20B, processor 2002 may fetch, decode, and execute further instructions 2016 (e.g., at the second site) for writing the part number signature metadata (e.g., 1700 of FIG. 17A or 17B) to the general use memory portion of the memory arrangement of the logic circuitry package. Processor 2002 may fetch, decode, and execute further instructions 2018 (e.g., at the second site) for writing the data (e.g., 1702 of FIG. 17B) to be stored in the plurality of data blocks as specified by the part number signature metadata to the general use memory portion of the memory arrangement of the logic circuitry package.

As an alternative or in addition to retrieving and executing instructions, processor 2002 may include one (i.e., a single) electronic circuit or more than one (i.e., multiple) electronic circuit comprising a number of electronic components for performing the functionality of one of the instructions or more than one of the instructions in machine-readable storage medium 2006. With respect to the executable instruction representations (e.g., boxes) described and illustrated herein, it should be understood that part or all of the executable instructions and/or electronic circuits included within one box may, in alternate examples, be included in a different box illustrated in the figures or in a different box not shown.

Machine-readable storage medium 2006 is a non-transitory storage medium and may be any suitable electronic, magnetic, optical, or other physical storage device that stores executable instructions. Thus, machine-readable storage medium 2006 may be, for example, a RAM, an EEPROM, a storage drive, an optical disc, and the like. Machine-readable storage medium 2006 may be disposed within system 2000, as illustrated in FIGS. 20A and 20B. In this case, the executable instructions may be installed on system 2000. Alternatively, machine-readable storage medium 2006 may be a portable, external, or remote storage medium that allows system 2000 to download the instructions from the portable/external/remote storage medium. In this case, the executable instructions may be part of an installation package.

Figure 21A:
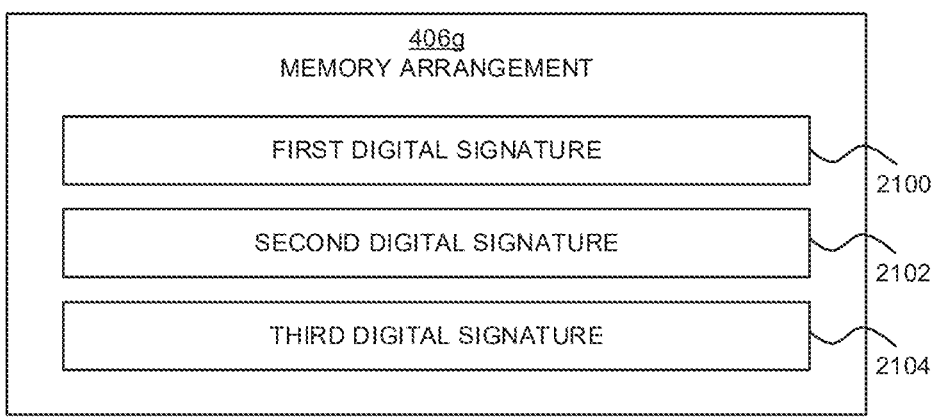
FIGS. 21A and 21B illustrate other example memory arrangements.

FIG. 21A illustrates another example of a memory arrangement 406g. In some examples, memory arrangement 406g may be an example of memory arrangement 406 of FIG. 4. Memory arrangement 406g includes a first digital signature 2100, a second digital signature 2102, and a third digital signature 2104. In one example, the third digital signature 2104 is signed over the first digital signature 2100 and the second digital signature 2102. In one example, the first digital signature is a perso signature (e.g., 502 of FIG. 5A, 5B, or 10), the second digital signature is a part number signature (e.g., 1304 of FIG. 10, 17A, or 17B), and the third digital signature is a manufacturing signature (e.g., 1204 of FIG. 12A or 12B). In one example, the first digital signature 2100 and the second digital signature 2102 are stored in a general use memory portion (e.g., 1030 of FIG. 10) of the memory arrangement configured for general purpose read/ write access, and the third digital signature 2104 is stored in an attribute memory portion (e.g., 1014 of FIG. 10) of the memory arrangement not configured for general purpose read/write access.

Examples of the memory arrangement 406g may provide for an architecture of multiple digital signatures that could be suitable for improving data integrity where multiple stages and/or parties are involved in writing data to the memory arrangement. Similar to FIG. 10, the examples of FIGS. 21A and 21B may encompass, at the same time, the different embodiments of digital signatures disclosed herein, such as the perso digital signature, the manufacturing digital signature and the part number digital signature, and respective metadata. However, other examples of the memory arrangement 406g may provide for an architecture of multiple digital signatures that can be used for other not described technical functions, other than specific manufacturing related stages between different suppliers as described herein. Examples of the memory arrangement 406g may be suitable for connecting to host apparatuses that require the digital signatures to be present, to pass an integrity check of the same host apparatus.

In some examples, the first digital signature is signed over data (e.g., 912 of FIG. 9) comprising at least one of a device type identifier corresponding to the logic circuitry package, a logic circuit identifier for the controller to differentiate the logic circuitry package from other logic circuitry packages, a partition map to define partitions of a general use memory portion of the memory arrangement, and first digital signature specified data stored in the general use memory portion of the memory arrangement. In some examples, the second digital signature is signed over common manufacturing data (e.g., 922 of FIG. 9) comprising at least one of a color, a fill level, and a region. In some examples, the third digital signature is signed over the first digital signature, the second digital signature, and the part-specific manufacturing data (e.g., 930 of FIG. 9) comprising at least one of a date of manufacture, a time of manufacture, and a manufacturing line identifier. At least one of the first, second, and third digital signatures may be signed over a hash of at least a portion of the above identified data, respectively.

Figure 21B:
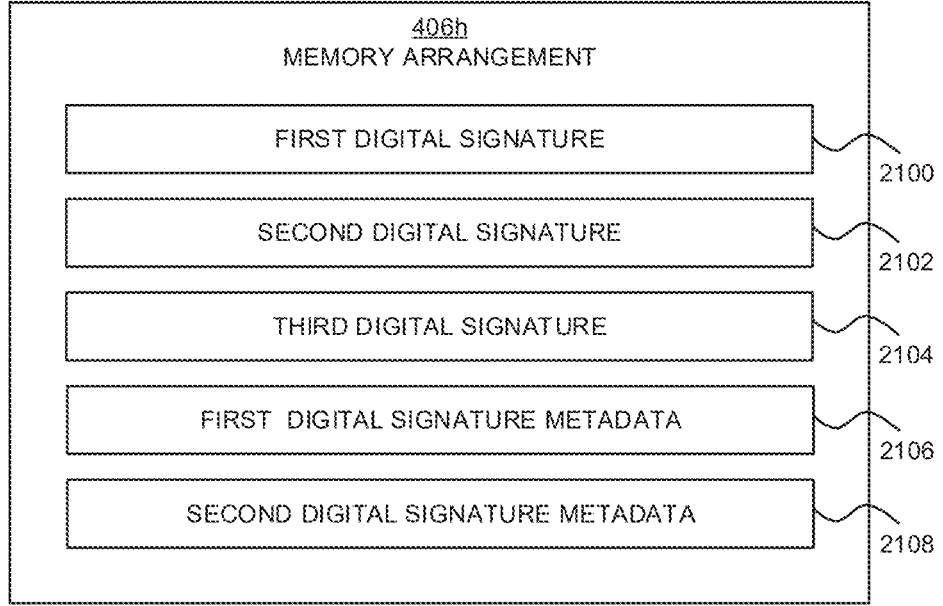

FIG. 21B illustrates another example of a memory arrangement 406h. In some examples, memory arrangement 406h may be another example of memory arrangement 406 of FIG. 4. Memory arrangement 406h stores a first digital signature 2100, a second digital signature 2102, and a third digital signature 2104 as previously described and illustrated with reference to FIG. 21A. In addition, memory arrangement 406h stores first digital signature metadata 2106 and second digital signature metadata 2108. The first digital signature metadata 2106 facilitates verification of the first digital signature 2100, and the second digital signature metadata 2108 facilitates verification of the second digital signature 2102. In some examples, the first digital signature metadata 2106 is perso signature metadata 600a or 600b previously described and illustrated with reference to FIGS.

6A and 6B, and the second digital signature metadata 2108 is part number signature metadata 1800a or 1800b previously described and illustrated with reference to FIGS. 18A and 18B. In some examples, the first digital signature metadata 2106 and the second digital signature metadata 2108 are configured based on the same schema.

Figure 22:
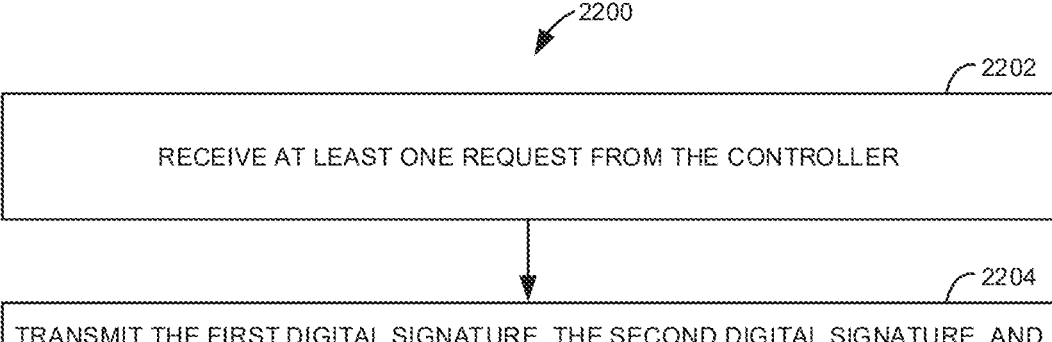
FIG. 22 is a flow diagram illustrating another example method that may be carried out by a logic circuit.

FIG. 22 is a flow diagram illustrating another example method 2200 that may be carried out by a logic circuit. The logic circuit may be part of a logic circuitry package (e.g., 402 of FIG. 4) for a replaceable print apparatus component (e.g., 400 of FIG. 4) including an interface (e.g., 408 of FIG. 4) to communicate with a controller (e.g., 304 of FIG. 3) as previously described. In this example, the memory arrangement stores a first digital signature (e.g., 2100 of FIG. 21A or 21B), a second digital signature (e.g., 2102 of FIG. 21A or 21B), and a third digital signature (e.g., 2104 of FIG. 21A or 21B) signed over the first digital signature and the second digital signature. As illustrated by method 2200 of FIG. 22 at 2202, the logic circuit is configured to receive at least one request from the controller. At 2204, the logic circuit is configured to transmit the first digital signature, the second digital signature, and the third digital signature (in any order) to the controller in response to the at least one request.

Examples in the present disclosure can be provided as methods, systems or machine readable instructions, such as any combination of software, hardware, firmware or the like. Such machine readable instructions may be included on a machine readable storage medium (including but not limited to EEPROM, PROM, flash memory, disc storage, CD-ROM, optical storage, etc.) having machine readable program codes therein or thereon.

The present disclosure is described with reference to flow charts and block diagrams of the method, devices, and systems according to examples of the present disclosure. Although the flow diagrams described above show a specific order of execution, the order of execution may differ from that which is depicted. Blocks described in relation to one flow chart may be combined with those of another flow chart. It shall be understood that at least some blocks in the flow charts and block diagrams, as well as combinations thereof can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing circuitry may execute the machine readable instructions. Thus, functional modules of the apparatus and devices (for example, logic circuitry and/or controllers) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array, etc. The methods and functional modules may all be performed by a single processor or divided amongst several processors.

Such machine readable instructions may also be stored in a machine readable storage (e.g., a tangible machine readable medium) that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by block(s) in the flow charts and/or in the block diagrams.

Further, the teachings herein may be implemented in the form of a computer software product, the computer software product being stored in a storage medium and comprising a plurality of instructions for making a computer device implement the methods recited in the examples of the present disclosure.

The word "comprising" does not exclude the presence of elements other than those listed in a claim, and "a" or "an" does not exclude a plurality.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

This disclosure addresses logic circuits comprising an interface to communicate with a host logic circuit. The logic circuit may be part of a package. The logic circuit may be a special purpose circuitry, such as a microcontroller, for example a secure microcontroller. The logic circuit may be configured to communicate with a print apparatus controller. The logic circuit(ry package) may be attached to or embedded in, or be attachable to, a replaceable print cartridge or component. The host logic circuit may comprise or be part of a print apparatus logic circuit such as a printer controller. The logic circuit and its features may be used in other applications, for example secure applications.

The logic circuit comprises a memory arrangement comprising any, any combination of any feasible selection, or all, of the following features. The memory arrangement may store digital signature metadata to facilitate verification of associated signed data. The digital signature metadata may comprise a schema identifier field storing a schema version number for the host to determine which schema to use. The digital signature metadata may comprise a key identifier field storing an identifier of a signing key for the host to use the correct key for the verification. The digital signature metadata may comprise a plurality of data block address fields, each data block address field of the plurality of data block address fields storing an address corresponding to a data block of a plurality of data blocks over which a digital signature is originally computed. The digital signature metadata may comprise a plurality of data block length fields corresponding to the plurality of data blocks, each data block length field of the plurality of data block length fields storing data indicating a length of the corresponding data block. The memory arrangement may store a logic circuit identifier for the controller to differentiate the logic circuitry package from other logic circuitry packages. The memory arrangement may store a partition map to define partitions of a general use memory portion of the memory arrangement. The memory arrangement may store digital signature metadata to facilitate verification of the associated signed data and specified data corresponding to the digital signature metadata. The memory arrangement may store a digital signature signed over data including a device type identifier corresponding to the logic circuitry package, the logic circuit identifier, the partition map, and the specified data. The memory arrangement may store indicated data over which a manufacturing digital signature is computed. The memory arrangement may store a certificate for the controller to verify the manufacturing digital signature. The memory arrangement may store manufacturing attribute data. The manufacturing attribute data may comprise at least one indication indicating the indicated data. The manufacturing attribute data may comprise the manufacturing digital signature. The memory arrangement may store a signing key for computing a manufacturing digital signature. The memory arrangement may store a key identifier to identify the signing key for computing the manufacturing digital signature and for the host to use the correct key for verifying associated signed data. The logic circuit may be configured to transmit, to the host, the key identifier in response to a request from the host. The memory arrangement may storing a first digital signature, a second digital signature, and a third digital signature signed over the first digital signature and the second digital signature. The memory arrangement may store part number signature metadata to facilitate verification of associated signed data. The part number signature metadata may comprise a schema identifier field storing a schema version number for the host to determine which schema to use. The part number signature metadata may comprise a key identifier field storing an identifier of a signing key for the host to use the correct key for the verification. The part number signature metadata may comprise a plurality of data block address fields, each data block address field of the plurality of data block address fields storing an address corresponding to a data block of a plurality of data blocks over which a part number signature is originally computed. The part number signature metadata may comprise a plurality of data block length fields corresponding to the plurality of data blocks, each data block length field of the plurality of data block length fields storing data indicating a length of the corresponding data block. The memory arrangement may store a part number signature signed over data including a device type identifier corresponding to the logic circuitry package and/or the part number signature specified data. A logic circuit provided with a memory arrangement comprising any, any combination of any feasible selection, or all, of the above features, may be configured in accordance with any, any combination of any feasible selection, or all, of the following features. The logic circuit may be configured to transmit the digital signature metadata to the host in response to the read request. The logic circuit may be configured to, in response to at least one request from the controller, transmit to the controller, the logic circuit identifier, the partition map, the digital signature, the digital signature metadata, and/or other data, and the specified data corresponding to the digital signature metadata. The logic circuit may be configured to transmit, to the controller, the manufacturing attribute data in response to at least one first request from the controller. The logic circuit may be configured to transmit, to the controller, the certificate and the indicated data in response to at least one second request from the controller. The logic circuit may be configured to transmit the first digital signature, the second digital signature, and the third digital signature to the controller in response to the at least one request. The logic circuit may be configured to transmit the part number signature metadata to the host in response to a read request. The memory arrangement may store part number signature specified data corresponding to the part number signature metadata. The logic circuit may be configured to, transmit to a controller, the part number signature, the part number signature metadata, and/or other data, and/or the part number signature specified data corresponding to the part number signature metadata. Any of the above derivable example logic circuits and/or example memory arrangements may be combined with any, any feasible selection, or all, of the following example features. The digital signature metadata may comprise a data block count field storing data indicating a total number of the plurality of data blocks. The digital signature metadata may comprise a length field storing data indicating a total accumulated length of the key identifier field, the data block count field, the plurality of data block address fields, and the plurality of data block length fields for the host to parse the digital signature metadata. The memory arrangement may store the digital signature corresponding to the digital signature metadata, the digital signature signed with the key that corresponds to the key identifier. The logic circuit may be configured to transmit the digital signature and the digital signature metadata to the host in response to at least one read request. The digital signature metadata and the digital signature may be stored in a general use memory portion of the memory arrangement configured for general purpose read/write access. The memory arrangement may comprise at least one different memory portion, not intended for general purpose read/write access, storing at least one cryptographic key and/or a plurality of attributes. The logic circuit may be configured to perform cryptographic operations using the at least one cryptographic key. The logic circuit may be configured to (i) return an attribute of the plurality of attributes in response to an attribute request that includes an associated attribute tag, and, (ii) associate the attribute with the attribute tag. The memory arrangement may store within partitions defined by the partition map, the digital signature, the digital signature metadata, specified data, and other data. The memory arrangement may store other data, unrelated to the digital signature, including print cartridge related characteristics. The manufacturing attribute data may comprise a key identifier corresponding to the certificate for the controller to verify the manufacturing digital signature. The at least one indication may comprise a plurality of data block addresses of the indicated data stored in the memory arrangement, and/or a plurality of data block length fields indicating the length of each corresponding data block. The at least one first request and the at least one second request may have differently encoded command type fields and/or include different opcodes, indicating different command types. The at least one first request may be configured to query attribute memory. The at least one second request may be configured to read general use memory. The indicated data over which the manufacturing digital signature is computed comprises at least one other digital signature. The indicated data may comprise part-specific manufacturing data. The manufacturing attribute data may comprise a key identifier. The key identifier may identify a private key used to compute the manufacturing digital signature. The certificate may comprise a public key corresponding to the private key. The certificate may be signed with a certificate authority private key to be verified by the controller with a certificate authority public key. The memory arrangement may store a plurality of key identifiers and associated signing keys. The memory arrangement may store a private key used to compute the manufacturing digital signature. The memory arrangement may store the private key, and the key identifier may correspond to the public key in the certificate and the certificate may further comprises the key identifier for the controller to confirm the correct certificate is used to verify the manufacturing digital signature using the public key. The logic circuit may be configured to compute the manufacturing digital signature. The logic circuit may be configured to compute the manufacturing digital signature, and at or after completion store the manufacturing digital signature in the memory arrangement. The memory arrangement may store attribute data for computing the manufacturing digital signature and to facilitate verification of associated signed data. The attribute data may comprise the key identifier. The attribute data may comprise the at least one indication. The logic circuit may be configured to transmit, to the host, the at least one indication in response to a request from the host. The logic circuit may be configured to: compute the manufacturing digital signature based on the attribute data; and store the manufacturing digital signature in the attribute data. The indicated data over which the manufacturing digital signature is computed may comprise a part-specific digital signature signed over data comprising at least one of: a device type identifier corresponding to the logic circuitry package; a logic circuit identifier for the host to differentiate the logic circuitry package from other logic circuitry packages; a partition map to define partitions of a general use memory portion of the memory arrangement; and/or, specified data stored in the general use memory portion of the memory arrangement. The indicated data over which the manufacturing digital signature is computed may comprise: a part number digital signature signed over common manufacturing data comprising at least one of: a color; a fill level; and/or a region. The indicated data over which the manufacturing digital signature is computed may comprise: part-specific manufacturing data comprising at least one of: a date of manufacture; a time of manufacture; and/or a manufacturing line identifier. Said first digital signature may be a perso signature. Said second digital signature may be a part number signature. Said third digital signature may be a manufacturing signature. The first digital signature may be signed over data comprising at least one of: a device type identifier corresponding to the logic circuitry package; a logic circuit identifier for the controller to differentiate the logic circuitry package from other logic circuitry packages; a partition map to define partitions of a general use memory portion of the memory arrangement; and/or first digital signature specified data stored in the general use memory portion of the memory arrangement. The second digital signature may be signed over common manufacturing data comprising at least one of: a color; a fill level; and/or a region. The third digital signature may be signed over part-specific manufacturing data comprising at least one of: a date of manufacture; a time of manufacture; and/or a manufacturing line identifier. The memory arrangement may store first digital signature metadata to facilitate verification of the first digital signature and/or second digital signature metadata to facilitate verification of the second digital signature. The first digital signature metadata and the second digital signature metadata may be configured based on the same schema and/or schema version. The first digital signature and the second digital signature may be stored in a general use memory portion of the memory arrangement configured for general purpose read/write access. The third digital signature may be stored in an attribute memory portion of the memory arrangement. The attribute memory portion may not be configured for general purpose read/write access. The part number signature metadata may comprise a data block count field storing data indicating a total number of the plurality of data blocks. The part number signature metadata may comprise a length field storing data indicating a total accumulated length of the key identifier field, the data block count field, the plurality of data block address fields, and/or the plurality of data block length fields for the host to parse the part number signature metadata. The memory arrangement may store the part number signature corresponding to the part number signature metadata, signed with the key that corresponds to the key identifier. The logic circuit may be configured to transmit the part number signature and/or the part number signature metadata to the host in response to at least one read request. The part number signature metadata and/or the part number signature may be stored in a general use memory portion of the memory arrangement configured for general purpose read/write access. The memory arrangement may store other data, unrelated to the part number signature, including print cartridge related data that is updateable over the lifetime of the logic circuitry.

What is claimed is:

1. A logic circuitry package comprising:

an interface to communicate with a controller; and a logic circuit comprising a memory arrangement storing a first digital signature, a second digital signature, and a third digital signature signed over both the first digital signature and the second digital signature, wherein the third digital signature provides hierarchical authentication of both the first and second digital signatures, wherein successful verification of the third digital signature using a corresponding public key automatically authenticates both the first and second digital signatures through a single verification operation;

wherein the logic circuit is configured to:

receive at least one request from the controller; and transmit the first digital signature, the second digital signature, and the third digital signature to the controller in response to the at least one request to allow the controller to verify the authenticity of both the first and second digital signatures through verification of the third digital signature.

2. The logic circuitry package of claim 1, wherein the first digital signature is a perso signature that authenticates device-specific data, the second digital signature is a part number signature that authenticates common manufacturing data, and the third digital signature is a manufacturing signature that provides hierarchical authentication of both the perso signature and the part number signature.

3. The logic circuitry package of claim 1, wherein the first digital signature is signed over data comprising at least one of:

a device type identifier corresponding to the logic circuitry package;

a logic circuit identifier for the controller to differentiate the logic circuitry package from other logic circuitry packages;

a partition map to define partitions of a general use memory portion of the memory arrangement; and first digital signature specified data stored in the general use memory portion of the memory arrangement.

4. The logic circuitry package of claim 1, wherein the second digital signature is signed over common manufacturing data comprising at least one of:

a color; a fill level; and a region.

5. The logic circuitry package of claim 1, wherein the third digital signature is signed over part-specific manufacturing data comprising at least one of:

a date of manufacture; a time of manufacture; and a manufacturing line identifier.

6. The logic circuitry package of claim 1, wherein the memory arrangement stores first digital signature metadata to facilitate verification of the first digital signature and second digital signature metadata to facilitate verification of the second digital signature, wherein the first and second digital signature metadata include schema information that defines the structure of data blocks over which the respective digital signatures are computed.

7. The logic circuitry package of claim 6, wherein the first digital signature metadata and the second digital signature metadata are configured based on the same schema, and wherein each metadata includes data block address fields and data block length fields that identify specific data blocks over which the respective digital signatures are computed.

8. A method for authenticating a logic circuitry package, the method comprising:

receiving, by a controller, a hierarchical set of digital signatures from a logic circuitry package, the hierarchical set comprising a first digital signature authenticating device-specific data, a second digital signature authenticating common manufacturing data, and a third digital signature signed over both the first and second digital signatures;

verifying the third digital signature using a public key corresponding to a manufacturing entity;

wherein successful verification of the third digital signature using the public key automatically establishes the authenticity of both the first and second digital signatures through a single verification operation; and authenticating the logic circuitry package based on the successful verification of all three digital signatures in the hierarchical set.

9. The method of claim 8, further comprising:

receiving digital signature metadata associated with the first and second digital signatures, wherein the metadata includes schema information; and verifying the schema information to ensure compatibility with the controller's verification process.

10. The method of claim 8, further comprising retrieving data blocks specified by digital signature metadata, wherein the data blocks contain information signed by the first and second digital signatures.

11. The method of claim 8, further comprising enabling full functionality of a print apparatus component associated with the logic circuitry package only after successful verification of all three digital signatures in the hierarchical set.

12. The method of claim 8, wherein verifying the third digital signature comprises:

concatenating the first digital signature, the second digital signature, and part-specific manufacturing data to form verification data; and verifying that the third digital signature was generated by applying a private key to the verification data.

13. The method of claim 8, wherein the first digital signature authenticates device-specific data including a device type identifier, a logic circuit identifier, a partition map, and specified data stored in a general use memory portion of the logic circuitry package.

14. The method of claim 13, further comprising using the authenticated device-specific data to configure communication parameters between the controller and the logic circuitry package.

15. A non-transitory computer-readable storage medium storing instructions that, when executed by a processor, cause the processor to:

transmit a request to a logic circuitry package of a print apparatus component to provide authentication information;

receive, in response to the request, a hierarchical set of digital signatures comprising a first digital signature authenticating device-specific data, a second digital signature authenticating common manufacturing data, and a third digital signature that hierarchically authenticates both the first and second digital signatures; and

verify the authenticity of the print apparatus component by validating the third digital signature using a public key, wherein successful validation of the third digital signature automatically authenticates both the first and second digital signatures through a single verification operation.

16. The non-transitory computer-readable storage medium of claim 15, wherein the instructions further cause the processor to:

receive digital signature metadata that defines data blocks over which the first and second digital signatures are computed;

retrieve the data blocks based on address and length information in the digital signature metadata; and verify the first and second digital signatures using the retrieved data blocks.

17. The non-transitory computer-readable storage medium of claim 15, wherein the instructions further cause the processor to enable specific print apparatus functionality only after successful verification of the hierarchical set of digital signatures.

18. The non-transitory computer-readable storage medium of claim 15, wherein verifying the hierarchical set of digital signatures comprises:

first verifying the third digital signature using a public key corresponding to a manufacturing entity;

upon successful verification of the third digital signature, verifying the first and second digital signatures; and authenticating the print apparatus component only after successful verification of all three digital signatures.

19. The non-transitory computer-readable storage medium of claim 15, wherein the instructions further cause the processor to:

extract print apparatus component characteristics from data authenticated by the first and second digital signatures; and configure print apparatus operations based on the extracted characteristics.

20. The non-transitory computer-readable storage medium of claim 19, wherein the print apparatus component characteristics include at least one of: color information, fill level information, region information, device type information, and partition map information that defines memory partitions within the logic circuitry package.

* * * * *